(12) United States Patent
Xing

(10) Patent No.: US 10,306,491 B2
(45) Date of Patent: May 28, 2019

(54) ANTENNA LINE DEVICE MANAGEMENT METHOD, AND DEVICE

(71) Applicant: Huawei Technologies Co., Ltd., Shenzhen (CN)

(72) Inventor: Hongwei Xing, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 121 days.

(21) Appl. No.: 15/653,097

(22) Filed: Jul. 18, 2017

(65) Prior Publication Data

US 2017/0318485 A1 Nov. 2, 2017

Related U.S. Application Data

(63) Continuation of application No. PCT/CN2016/071021, filed on Jan. 15, 2016.

(30) Foreign Application Priority Data

Jan. 19, 2015 (CN) .......................... 2015 1 0026479

(51) Int. Cl.
*H04W 24/04* (2009.01)
*H04W 24/00* (2009.01)
(Continued)

(52) U.S. Cl.
CPC ......... *H04W 24/04* (2013.01); *H04L 41/0686* (2013.01); *H04L 41/12* (2013.01);
(Continued)

(58) Field of Classification Search
CPC ..... H04W 24/00; H04W 24/04; H04W 8/005; H04L 41/0686; H04L 61/2007; H04L 41/12
See application file for complete search history.

(56) References Cited

U.S. PATENT DOCUMENTS

| 2006/0277309 A1* | 12/2006 | Eaton .................... H04W 8/005 |
| | | 709/227 |
| 2008/0300022 A1 | 12/2008 | Dong et al. |
| 2012/0038513 A1* | 2/2012 | Li .......................... H01Q 1/246 |
| | | 342/372 |

FOREIGN PATENT DOCUMENTS

| CN | 101317300 A | 12/2008 |
| CN | 101626581 A | 1/2010 |

(Continued)

OTHER PUBLICATIONS

Antenna Interface Standards Group, "Control Interface for Antenna Line Devices," Standard No. AISG v2.0, Jun. 13, 2006, 42 pages.
(Continued)

*Primary Examiner* — Vinncelas Louis
(74) *Attorney, Agent, or Firm* — Slater Matsil, LLP

(57) ABSTRACT

Embodiments of the present application provide an antenna line device management method, and devices. A primary device sends a scanning command to an antenna line device, where the scanning command is used to scan the antenna line device; receives a scanning response sent by the antenna line device, where the scanning response includes indication information used to indicate a type of the antenna line device, and the type of the antenna line device is a container antenna line device; sends an HDLC address assignment command to the antenna line device, where the HDLC address assignment command includes an HDLC address assigned by the primary device to the antenna line device; establishes a communication link to the antenna line device according to the HDLC address; sends a capability information query command to the antenna line device; and receives a capability information report sent by the antenna line device.

18 Claims, 13 Drawing Sheets

(51) Int. Cl.
*H04L 12/24* (2006.01)
*H04L 29/12* (2006.01)
(52) U.S. Cl.
CPC ......... *H04L 61/2007* (2013.01); *H04W 24/00* (2013.01); *H04L 61/6022* (2013.01)

(56) References Cited

FOREIGN PATENT DOCUMENTS

| | | | |
|---|---|---|---|
| CN | 102511180 | A | 6/2012 |
| CN | 102811452 | A | 12/2012 |
| CN | 103389706 | A | 11/2013 |
| CN | 104507116 | A | 4/2015 |
| EP | 2003731 | A2 | 12/2008 |

OTHER PUBLICATIONS

Antenna Interface Standards Group (AISG), "Control Interface for Antenna Line Devices," Standard No. AISG1: Issue 1.1, Jul. 30, 2004, pp. 1-56.

* cited by examiner

ANTENNA LINE DEVICE MANAGEMENT METHOD, AND DEVICE

CROSS-REFERENCE TO RELATED APPLICATIONS

This application is a continuation of International Application No. PCT/CN2016/071021, filed on Jan. 15, 2016, which claims priority to Chinese Patent Application No. 201510026479.0, filed on Jan. 19, 2015. The disclosures of the aforementioned applications are hereby incorporated by reference in their entireties.

TECHNICAL FIELD

Embodiments of the present application relate to the field of communications technologies, and in particular, to an antenna line device management method, and devices.

BACKGROUND

Antenna line devices (ALD for short) are usually mounted between a base station and an antenna. The base station needs to manage these ALDs. The base station and the ALDs all need to comply with software and hardware standards stipulated in protocols of the Antenna Interface Standards Group (AISG for short), and therefore the base station can communicate with the ALDs. Specifically, n ALDs (an ALD1, an ALD2, . . . , and an ALDn) are connected to the base station and the antenna, as shown in FIG. 1. The base station then finds the n ALDs through scanning. The base station needs to establish communication links to the n ALDs one by one before the base station can operate and configure the n ALDs, as shown in FIG. 2. Because the n ALDs are based on AISG protocols with different release numbers, the base station needs to establish communication connections to ALDs of various AISG protocols. As a result, complexity of management by the base station is increased.

SUMMARY

Embodiments of the present application provide an antenna line device management method, and devices, so as to reduce complexity of managing an antenna line device by a base station.

According to a first aspect, an embodiment of the present application provides an antenna line device management method. The method includes sending, by a primary device, a scanning command to an antenna line device, where the scanning command is used to scan the antenna line device. The method also includes receiving, by the primary device, a scanning response sent by the antenna line device, where the scanning response includes indication information used to indicate a type of the antenna line device, the type of the antenna line device is a container antenna line device, the container antenna line device has a capability of managing multiple subdevices, and connection lines between all ports of the container antenna line device and a processor of the first antenna line device are different from each other. The method also includes sending, by the primary device, a High-Level Data Link Control HDLC for short) address assignment command to the antenna line device, where the HDLC address assignment command includes an HDLC address assigned by the primary device to the antenna line device. The method also includes establishing, by the primary device, a communication link to the antenna line device according to the HDLC address. The method also includes sending, by the primary device, a capability information query command to the antenna line device. The method also includes receiving, by the primary device, a capability information report sent by the antenna line device, where the capability information report includes function information of each of N subdevices managed by the antenna line device, where N is an integer greater than or equal to 0. The method also includes managing, by the primary device, the N subdevices according to the capability information report.

In a first possible implementation manner of the first aspect, the capability information report further includes an identifier, in the antenna line device, of each of the N subdevices managed by the antenna line device; and the managing, by the primary device, the N subdevices according to the capability information report includes: sending, by the primary device according to a function of a to-be-managed subdevice, a management command used to manage the to-be-managed subdevice to the antenna line device, where the management command includes an identifier, in the antenna line device, of the to-be-managed subdevice, and the to-be-managed subdevice is any one of the N subdevices managed by the antenna line device.

With reference to the first aspect or the first possible implementation manner of the first aspect, in a second possible implementation manner of the first aspect, the scanning response further includes a communications protocol set supported by the antenna line device, where the communications protocol set includes a release number of each communications protocol supported by the antenna line device; before the sending, by the primary device, an HDLC address assignment command to the antenna line device, the method further includes: when there is a communications protocol supported by the primary device in the communications protocol set supported by the antenna line device, selecting, by the primary device, a release number of a communications protocol supported by the primary device from the communications protocol set supported by the antenna line device; the sending, by the primary device, an HDLC address assignment command to the antenna line device includes: sending, by the primary device to the antenna line device, an HDLC address assignment command including the HDLC address and the release number of the communications protocol that is selected by the primary device; and the establishing, by the primary device, a communication link to the antenna line device according to the HDLC address includes: establishing, by the primary device, the communication link to the antenna line device according to the HDLC address and the communications protocol selected by the primary device.

With reference to the second possible implementation manner of the first aspect, in a third possible implementation manner of the first aspect, when there is no communications protocol supported by the primary device in the communications protocol set supported by the antenna line device, the primary device sends a failure report to a network administrator, where the failure report is used to indicate that the primary device does not support management of the antenna line device.

With reference to any one of the first aspect or the first to the third possible implementation manners of the first aspect, in a fourth possible implementation manner of the first aspect, after the establishing, by the primary device, a communication link to the antenna line device according to the HDLC address, the method further includes: receiving, by the primary device, topological relationship information sent by the antenna line device, where the topological relationship information is used to indicate antenna line devices sequentially connected to each of all ports of the antenna line device; and creating, by the primary device according to the topological relationship information, a tree topological relationship diagram that uses the primary device as a root node.

With reference to the fourth possible implementation manner of the first aspect, in a fifth possible implementation manner of the first aspect, the tree topological relationship diagram includes a star topological relationship diagram and/or a chain topological relationship diagram.

With reference to any one of the first aspect or the first to the fifth possible implementation manners of the first aspect, in a sixth possible implementation manner of the first aspect, after the establishing, by the primary device, a communication link to the antenna line device according to the HDLC address, the method further includes: sending, by the primary device, a permission configuration command to the antenna line device, where the permission configuration command is used to configure a permission of the primary device of the antenna line device to manage the N subdevices by using a port of the antenna line device.

With reference to any one of the first aspect or the first to the sixth possible implementation manners of the first aspect, in a seventh possible implementation manner of the first aspect, the method further includes: receiving, by the primary device, a capability information change report sent by the antenna line device, where the capability information change report includes function information of each of T subdevices currently managed by the antenna line device, where T is an integer greater than or equal to 0.

With reference to any one of the first aspect or the first to the seventh possible implementation manners of the first aspect, in an eighth possible implementation manner of the first aspect, the primary device is a base station, a portable control unit (PCU for short), or a container antenna line device.

According to a second aspect, an embodiment of the present application provides an antenna line device management method. The method includes receiving, by a first antenna line device, a first scanning command sent by a primary device of the first antenna line device, where the first scanning command is used to scan the first antenna line device. The method also includes sending, by the first antenna line device, a first scanning response to the primary device according to the first scanning command, where the first scanning response includes indication information used to indicate a type of the first antenna line device, the type of the first antenna line device is a container antenna line device, the container antenna line device has a capability of managing multiple subdevices, and connection lines between all ports of the container antenna line device and a processor of the first antenna line device are different from each other. The method also includes receiving, by the first antenna line device, a first HDLC address assignment command sent by the primary device, where the first HDLC address assignment command includes a first HDLC address assigned by the primary device to the first antenna line device. The method also includes establishing, by the first antenna line device, a communication link to the primary device according to the first HDLC address. The method also includes receiving, by the first antenna line device, a first capability information query command sent by the primary device. The method also includes sending, by the first antenna line device, a first capability information report to the primary device according to the first capability information query command, where the first capability information report includes function information of each of N subdevices managed by the first antenna line device, where N is an integer greater than or equal to 0.

In a first possible implementation manner of the second aspect, the first scanning response further includes a first communications protocol set supported by the first antenna line device, where the first communications protocol set includes a release number of each communications protocol supported by the first antenna line device; when there is a communications protocol supported by the primary device in the first communications protocol set supported by the first antenna line device, the receiving, by the first antenna line device, a first HDLC address assignment command sent by the primary device includes: receiving, by the first antenna line device, a first HDLC address assignment command that is sent by the primary device and that includes the first HDLC address and a first release number of a communications protocol that is selected by the primary device from the first communications protocol set; and the establishing, by the first antenna line device, a communication link to the primary device according to the first HDLC address includes: establishing, by the first antenna line device, the communication link to the primary device according to the first HDLC address and the communications protocol that corresponds to the first release number.

With reference to the second aspect or the first possible implementation manner of the second aspect, in a second possible implementation manner of the second aspect, the method further includes: sending, by the first antenna line device, a second scanning command to a second antenna line device, where the second antenna line device is any antenna line device cascaded with the first antenna line device, and the second scanning command is used to scan the second antenna line device; receiving, by the first antenna line device, a second scanning response sent by the second antenna line device, where the second scanning response includes indication information used to indicate a type of the second antenna line device; sending, by the first antenna line device, a second HDLC address assignment command to the second antenna line device, where the second HDLC address assignment command includes a second HDLC address assigned by the first antenna line device to the second antenna line device; establishing, by the first antenna line device, a communication link to the second antenna line device according to the second HDLC address; and obtaining, by the first antenna line device according to the indication information in the second scanning response, function information of a subdevice managed by the second antenna line device, and using the subdevice managed by the second antenna line device as a subdevice managed by the first antenna line device.

With reference to the second possible implementation manner of the second aspect, in a third possible implementation manner of the second aspect, when the indication information in the second scanning response is used to indicate that the type of the second antenna line device is a container antenna line device, the obtaining, by the first antenna line device according to the indication information in the second scanning response, function information of a subdevice managed by the second antenna line device includes: sending, by the first antenna line device, a second capability information query command to the second antenna line device; and receiving, by the first antenna line device, a second capability information report sent by the second antenna line device, where the second capability information report includes function information of K subdevices managed by the second antenna line device, where K is an integer greater than or equal to 0.

With reference to the third possible implementation manner of the second aspect, in a fourth possible implementation manner of the second aspect, the second scanning response further includes a second communications protocol set supported by the second antenna line device, where the second communications protocol set includes a release number of each communications protocol supported by the second antenna line device; before the sending, by the first antenna line device, a second HDLC address assignment command to the second antenna line device, the method further includes: when there is a communications protocol supported by the first antenna line device in the second communications protocol set supported by the second antenna line device, selecting, by the first antenna line device, a communications protocol supported by the first antenna line device from the second communications protocol set supported by the second antenna line device; the sending, by the first antenna line device, a second HDLC address assignment command to the second antenna line device includes: sending, by the first antenna line device to the second antenna line device, a second HDLC address assignment command including the second HDLC address and a second release number of the communications protocol selected by the first antenna line device; and the establishing, by the first antenna line device, a communication link to the second antenna line device according to the second HDLC address includes: establishing, by the first antenna line device, the communication link to the second antenna line device according to the second HDLC address and the communications protocol that corresponds to the second release number.

With reference to the fourth possible implementation manner of the second aspect, in a fifth possible implementation manner of the second aspect, the first release number is the same as or different from the second release number.

With reference to any one of the second to the fifth possible implementation manners of the second aspect, in a sixth possible implementation manner of the second aspect, the first capability information report further includes an identifier, in the first antenna line device, of each of the N subdevices managed by the first antenna line device; and the method further includes: receiving, by the first antenna line device, a management command that is sent by the primary device and that is used to manage a first subdevice, where the management command includes an identifier, in the first antenna line device, of the first subdevice, and the first subdevice is any subdevice managed by the first antenna line device; and sending, by the first antenna line device, the management command to the first subdevice according to the identifier, in the first antenna line device, of the first subdevice.

With reference to the sixth possible implementation manner of the second aspect, in a seventh possible implementation manner of the second aspect, if the first subdevice is disposed in the second antenna line device, the sending, by the first antenna line device, the management command to the first subdevice according to the identifier, in the first antenna line device, of the first subdevice includes: performing, by the first antenna line device, format conversion on the management command according to the type of the second antenna line device and a communications protocol for communication between the first antenna line device and the second antenna line device, and sending the management command after the format conversion to the second antenna line device.

With reference to any one of the second to the seventh possible implementation manners of the second aspect, in an eighth possible implementation manner of the second aspect, after the establishing, by the first antenna line device, a communication link to the primary device according to the first HDLC address, the method further includes: sending, by the first antenna line device, first topological relationship information to the primary device, where the first topological relationship information is used to indicate antenna line devices sequentially connected to each of all ports of the first antenna line device.

With reference to the eighth possible implementation manner of the second aspect, in a ninth possible implementation manner of the second aspect, after the establishing, by the first antenna line device, a communication link to the second antenna line device according to the second HDLC address, the method further includes: receiving, by the first antenna line device, second topological relationship information sent by the second antenna line device, where the second topological relationship information is used to indicate antenna line devices sequentially connected to each of all ports of the second antenna line device; and obtaining, by the first antenna line device as antenna line devices sequentially connected to a first port of the first antenna line device, the second antenna line device that is first connected to the first port of the first antenna line device and the antenna line devices that are sequentially connected to each of all the ports of the second antenna line device, where the first port is any port of the first antenna line device, and an antenna line device that is first connected to the first port is the second antenna line device.

With reference to any one of the second aspect or the first to the ninth possible implementation manners of the second aspect, in a tenth possible implementation manner of the second aspect, after the establishing, by the first antenna line device, a communication link to the primary device according to the first HDLC address, the method further includes: receiving, by the first antenna line device, a permission configuration command sent by the primary device, where the permission configuration command is used to configure a permission of the primary device of the antenna line device to manage the N subdevices by using a port of the first antenna line device; and configuring, by the first antenna line device according to the permission configuration command, the permission of the primary device of the antenna line device to manage the N subdevices by using a port of the first antenna line device.

With reference to the second aspect or the first to the tenth possible implementation manners of the second aspect, in an eleventh possible implementation manner of the second aspect, when a subdevice managed by the first antenna line device changes, the method further includes: sending, by the first antenna line device, a capability information change report to the primary device, where the capability information change report includes function information of each of T subdevices currently managed by the first antenna line device, where T is an integer greater than or equal to 0.

With reference to the second aspect or the first to the eleventh possible implementation manners of the second aspect, in a twelfth possible implementation manner of the second aspect, the primary device is a base station, a container antenna line device, or a PCU.

According to a third aspect, an embodiment of the present application provides a primary device. The primary device includes a sending unit, configured to send a scanning command to an antenna line device, where the scanning command is used to scan the antenna line device. The primary device also includes a receiving unit, configured to receive a scanning response sent by the antenna line device, where the scanning response includes indication information used to indicate a type of the antenna line device, the type of the antenna line device is a container antenna line device, the container antenna line device has a capability of managing multiple subdevices, and connection lines between all ports of the container antenna line device and a processor of the first antenna line device are different from each other. The sending unit is further configured to send an HDLC address assignment command to the antenna line device, where the HDLC address assignment command includes an HDLC address assigned by the primary device to the antenna line device. The primary device also includes a processing unit, configured to establish a communication link to the antenna line device according to the HDLC address. The sending unit is further configured to send a capability information query command to the antenna line device. The receiving unit is further configured to receive a capability information report sent by the antenna line device, where the capability information report includes function information of each of N subdevices managed by the antenna line device, where N is an integer greater than or equal to 0. The processing unit is further configured to manage the N subdevices according to the capability information report.

In a first possible implementation manner of the third aspect, the capability information report further includes an identifier, in the antenna line device, of each of the N subdevices managed by the antenna line device; and when managing the N subdevices according to the capability information report, the processing unit is specifically configured to send, according to a function of a to-be-managed subdevice, a management command used to manage the to-be-managed subdevice to the antenna line device, where the management command includes an identifier, in the antenna line device, of the to-be-managed subdevice, and the to-be-managed subdevice is any one of the N subdevices managed by the antenna line device.

With reference to the third aspect or the first possible implementation manner of the third aspect, in a second possible implementation manner of the third aspect, the scanning response further includes a communications protocol set supported by the antenna line device, where the communications protocol set includes a release number of each communications protocol supported by the antenna line device; the processing unit is further configured to: before the sending unit sends the HDLC address assignment command to the antenna line device, when there is a communications protocol supported by the primary device in the communications protocol set supported by the antenna line device, select a release number of a communications protocol supported by the primary device from the communications protocol set supported by the antenna line device; when sending an HDLC address assignment command to the antenna line device, the sending unit is specifically configured to send, to the antenna line device, an HDLC address assignment command including the HDLC address and the release number of the communications protocol that is selected by the primary device; and when establishing a communication link to the antenna line device according to the HDLC address, the processing unit is specifically configured to establish the communication link to the antenna line device according to the HDLC address and the communications protocol selected by the primary device.

With reference to the second possible implementation manner of the third aspect, in a third possible implementation manner of the third aspect, the sending unit is further configured to: when there is no communications protocol supported by the primary device in the communications protocol set supported by the antenna line device, send a failure report to a network administrator, where the failure report is used to indicate that the primary device does not support management of the antenna line device.

With reference to any one of the third aspect or the first to the third possible implementation manners of the third aspect, in a fourth possible implementation manner of the third aspect, the receiving unit is further configured to: after the communication link is established to the antenna line device according to the HDLC address, receive topological relationship information sent by the antenna line device, where the topological relationship information is used to indicate antenna line devices sequentially connected to each of all ports of the antenna line device; and the processing unit is further configured to create, according to the topological relationship information, a tree topological relationship diagram that uses the primary device as a root node.

With reference to the fourth possible implementation manner of the third aspect, in a fifth possible implementation manner of the third aspect, the tree topological relationship diagram includes a star topological relationship diagram and/or a chain topological relationship diagram.

With reference to any one of the third aspect to the first to the fifth possible implementation manners of the third aspect, in a sixth possible implementation manner of the third aspect, the sending unit is further configured to: after the processing unit establishes the communication link to the antenna line device according to the HDLC address, send a permission configuration command to the antenna line device, where the permission configuration command is used to configure a permission of the primary device of the antenna line device to manage the N subdevices by using a port of the antenna line device.

With reference to any one of the third aspect or the first to the sixth possible implementation manners of the third aspect, in a seventh possible implementation manner of the third aspect, the receiving unit is further configured to receive a capability information change report sent by the antenna line device, where the capability information change report includes function information of each of T subdevices currently managed by the antenna line device, where T is an integer greater than or equal to 0.

With reference to any one of the third aspect or the first to the seventh possible implementation manners of the third aspect, in an eighth possible implementation manner of the third aspect, the primary device is a base station, a PCU, or a container antenna line device.

According to a fourth aspect, an embodiment of the present application provides an antenna line device. When being used as a first antenna line device, the antenna line device includes a receiving unit, configured to receive a first scanning command sent by a primary device of the first antenna line device, where the first scanning command is used to scan the first antenna line device. The antenna line device also includes a sending unit, configured to send a first scanning response to the primary device according to the first scanning command, where the first scanning response includes indication information used to indicate a type of the first antenna line device, the type of the first antenna line device is a container antenna line device, the container antenna line device has a capability of managing multiple subdevices, and connection lines between all ports of the container antenna line device and a processor of the first antenna line device are different from each other. The receiving unit is further configured to receive a first HDLC address assignment command sent by the primary device, where the first HDLC address assignment command includes a first HDLC address assigned by the primary device to the first antenna line device. The antenna line device also includes a processing unit, configured to establish a communication link to the primary device according to the first HDLC address. The receiving unit is further configured to receive a first capability information query command sent by the primary device. The sending unit is further configured to send a first capability information report to the primary device according to the first capability information query command, where the first capability information report includes function information of each of N subdevices managed by the first antenna line device, where N is an integer greater than or equal to 0.

In a first possible implementation manner of the fourth aspect, the first scanning response further includes a first communications protocol set supported by the first antenna line device, where the first communications protocol set includes a release number of each communications protocol supported by the first antenna line device; when there is a communications protocol supported by the primary device in the first communications protocol set supported by the first antenna line device, when receiving the first HDLC address assignment command sent by the primary device, the receiving unit is specifically configured to receive a first HDLC address assignment command that is sent by the primary device and that includes the first HDLC address and a first release number of a communications protocol that is selected by the primary device from the first communications protocol set; and when establishing a communication link to the primary device according to the first HDLC address, the processing unit is specifically configured to establish the communication link to the primary device according to the first HDLC address and the communications protocol that corresponds to the first release number.

With reference to the fourth aspect or the first possible implementation manner of the fourth aspect, in a second possible implementation manner of the fourth aspect, the sending unit is further configured to send a second scanning command to a second antenna line device, where the second antenna line device is any antenna line device cascaded with the first antenna line device, and the second scanning command is used to scan the second antenna line device; the receiving unit is further configured to receive a second scanning response sent by the second antenna line device, where the second scanning response includes indication information used to indicate a type of the second antenna line device; the sending unit is further configured to send a second HDLC address assignment command to the second antenna line device, where the second HDLC address assignment command includes a second HDLC address assigned by the first antenna line device to the second antenna line device; and the processing unit is further configured to: establish a communication link to the second antenna line device according to the second HDLC address, obtain, according to the indication information in the second scanning response, function information of a subdevice managed by the second antenna line device, and use the subdevice managed by the second antenna line device as a subdevice managed by the first antenna line device.

With reference to the second possible implementation manner of the fourth aspect, in a third possible implementation manner of the fourth aspect, when the indication information in the second scanning response is used to indicate that the type of the second antenna line device is a container antenna line device, when obtaining, according to the indication information in the second scanning response, the function information of the subdevice managed by the second antenna line device, the processing unit is specifically configured to: send a second capability information query command to the second antenna line device; and receive a second capability information report sent by the second antenna line device, where the second capability information report includes function information of K subdevices managed by the second antenna line device, where K is an integer greater than or equal to 0.

With reference to the third possible implementation manner of the fourth aspect, in a fourth possible implementation manner of the fourth aspect, the second scanning response further includes a second communications protocol set supported by the second antenna line device, where the second communications protocol set includes a release number of each communications protocol supported by the second antenna line device; the processing unit is further configured to: before the sending unit sends the second HDLC address assignment command to the second antenna line device, when there is a communications protocol supported by the first antenna line device in the second communications protocol set supported by the second antenna line device, select a communications protocol supported by the first antenna line device from the second communications protocol set supported by the second antenna line device; when sending a second HDLC address assignment command to the second antenna line device, the sending unit is specifically configured to send, to the second antenna line device, a second HDLC address assignment command including the second HDLC address and a second release number of the communications protocol selected by the first antenna line device; and when establishing a communication link to the second antenna line device according to the second HDLC address, the processing unit is specifically configured to establish the communication link to the second antenna line device according to the second HDLC address and the communications protocol that corresponds to the second release number.

With reference to the fourth possible implementation manner of the fourth aspect, in a fifth possible implementation manner of the fourth aspect, the first release number is the same as or different from the second release number.

With reference to any one of the second to the fifth possible implementation manners of the fourth aspect, in a sixth possible implementation manner of the fourth aspect, the first capability information report further includes an identifier, in the first antenna line device, of each of the N subdevices managed by the first antenna line device; and the receiving unit is further configured to receive a management command that is sent by the primary device and that is used to manage a first subdevice, where the management command includes an identifier, in the first antenna line device, of the first subdevice, and the first subdevice is any subdevice managed by the first antenna line device; and the sending unit is further configured to send the management command to the first subdevice according to the identifier, in the first antenna line device, of the first subdevice.

With reference to the sixth possible implementation manner of the fourth aspect, in a seventh possible implementation manner of the fourth aspect, if the first subdevice is disposed in the second antenna line device, when sending the management command to the first subdevice according to the identifier, in the first antenna line device, of the first subdevice, the sending unit is specifically configured to: perform format conversion on the management command according to the type of the second antenna line device and a communications protocol for communication between the first antenna line device and the second antenna line device, and send the management command after the format conversion to the second antenna line device.

With reference to any one of the fourth aspect or the second to the seventh possible implementation manners of the fourth aspect, in an eighth possible implementation manner of the fourth aspect, the sending unit is further configured to: after the processing unit establishes the communication link to the primary device according to the first HDLC address, send first topological relationship information to the primary device, where the first topological relationship information is used to indicate antenna line devices sequentially connected to each of all ports of the first antenna line device.

With reference to the eighth possible implementation manner of the fourth aspect, in a ninth possible implementation manner of the fourth aspect, the receiving unit is further configured to: after the processing unit establishes the communication link to the second antenna line device according to the second HDLC address, receive second topological relationship information sent by the second antenna line device, where the second topological relationship information is used to indicate antenna line devices sequentially connected to each of all ports of the second antenna line device; and the processing unit is further configured to obtain, as antenna line devices sequentially connected to a first port of the first antenna line device, the second antenna line device that is first connected to the first port of the first antenna line device and the antenna line devices that are sequentially connected to each of all the ports of the second antenna line device, where the first port is any port of the first antenna line device, and an antenna line device that is first connected to the first port is the second antenna line device.

With reference to the fourth aspect or the first to the ninth possible implementation manners of the fourth aspect, in a tenth possible implementation manner of the third aspect, the receiving unit is further configured to: after the processing unit establishes the communication link to the primary device according to the first HDLC address, receive a permission configuration command sent by the primary device, where the permission configuration command is used to configure a permission of the primary device of the antenna line device to manage the N subdevices by using a port of the first antenna line device; and the processing unit is further configured to configure, according to the permission configuration command, the permission of the primary device of the antenna line device to manage the N subdevices by using a port of the first antenna line device.

With reference to the fourth aspect or the first to the tenth possible implementation manners of the fourth aspect, in an eleventh possible implementation manner of the fourth aspect, when a subdevice managed by the first antenna line device changes, the sending unit is further configured to send a capability information change report to the primary device, where the capability information change report includes function information of each of T subdevices currently managed by the first antenna line device, where T is an integer greater than or equal to 0.

With reference to the fourth aspect or the first to the eleventh possible implementation manners of the fourth aspect, in a twelfth possible implementation manner of the fourth aspect, the primary device is a base station, a container antenna line device, or a PCU.

The embodiments of the present application provide an antenna line device management method and devices. After obtaining a container antenna line device through scanning, a primary device establishes a communication link to the antenna line device, then sends a capability information query command to the antenna line device according to a fact that the antenna line device is the container antenna line device, so as to obtain function information of subdevices managed by the antenna line device, and then manages the subdevices. Therefore, the primary device may establish a communication connection to the container antenna line device, so that the primary device can manage a subdevice (for example, an antenna line device cascaded with the container antenna line device) managed by the container antenna line device, thereby reducing complexity of managing an antenna line device by a primary device.

BRIEF DESCRIPTION OF THE DRAWINGS

To describe the technical solutions in the embodiments of the present application or in the prior art more clearly, the following briefly describes the accompanying drawings required for describing the embodiments or the prior art. Apparently, the accompanying drawings in the following description show some embodiments of the present application, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present application clearer, the following clearly describes the technical solutions in the embodiments of the present application with reference to the accompanying drawings in the embodiments of the present application. Apparently, the described embodiments are some but not all of the embodiments of the present application. All other embodiments obtained by a person of ordinary skill in the art based on the embodiments of the present application without creative efforts shall fall within the protection scope of the present application.

It should be noted that a primary device mentioned in the present application may be a base station, a portable control unit (PCU for short), or a container antenna line device.

Figure 1:
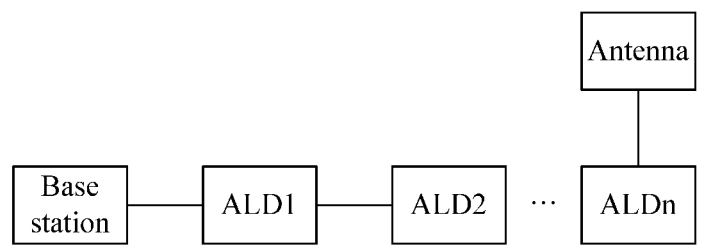
FIG. 1 is a schematic diagram of physical connections between an ALD and a base station and between an ALD and an antenna in the prior art.
Figure 2:
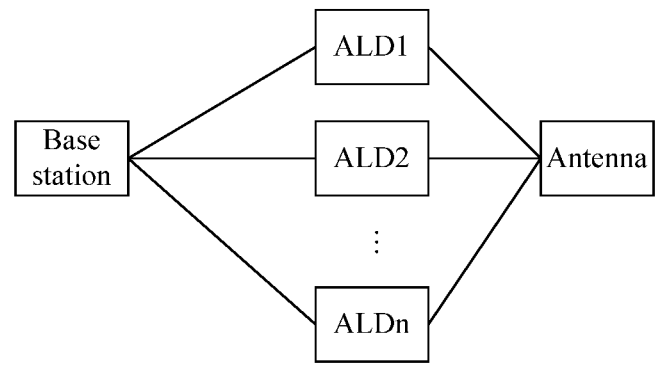
FIG. 2 is a schematic diagram of logical connections between an ALD and a base station and between an ALD and an antenna in the prior art.
Figure 3:
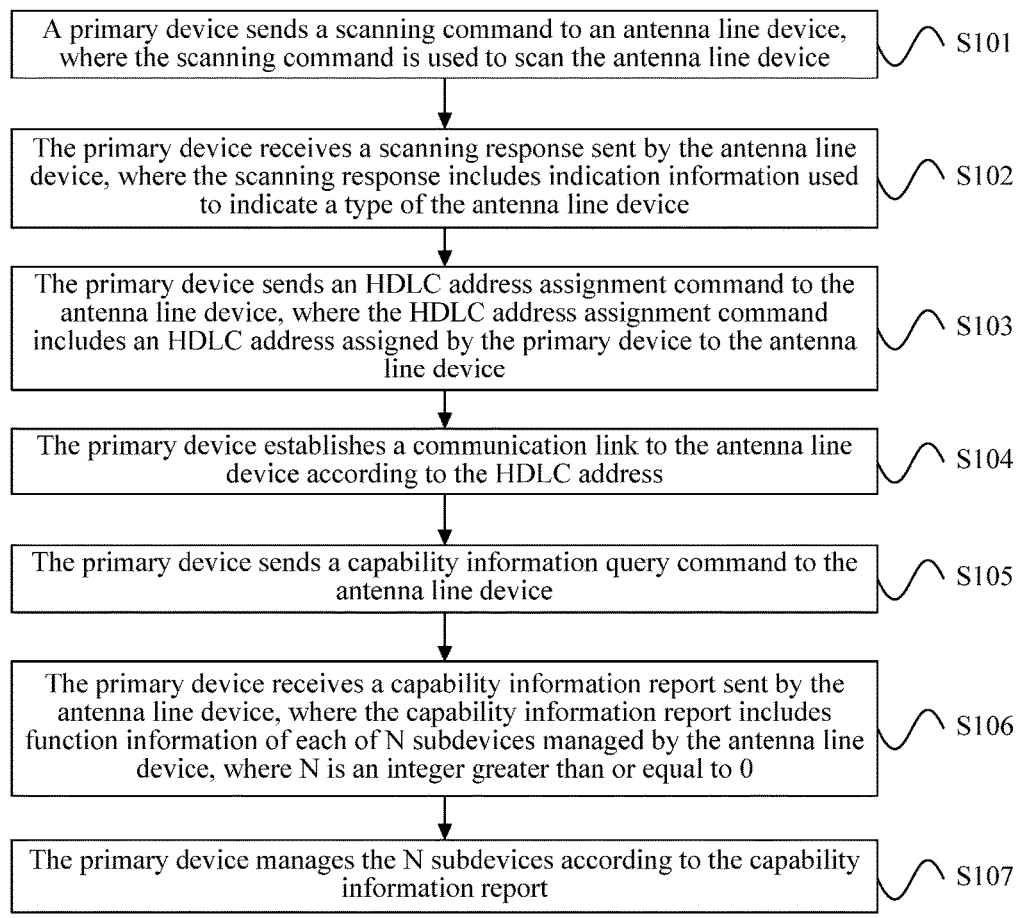
FIG. 3 is a flowchart of Embodiment 1 of an antenna line device management method according to the present application.

FIG. 3 is a flowchart of Embodiment 1 of an antenna line device management method according to the present application. As shown in FIG. 3, the method in this embodiment may include the following steps.

S101. A primary device sends a scanning command to an antenna line device, where the scanning command is used to scan the antenna line device.

S102. The primary device receives a scanning response sent by the antenna line device, where the scanning response includes indication information used to indicate a type of the antenna line device.

Figure 4:
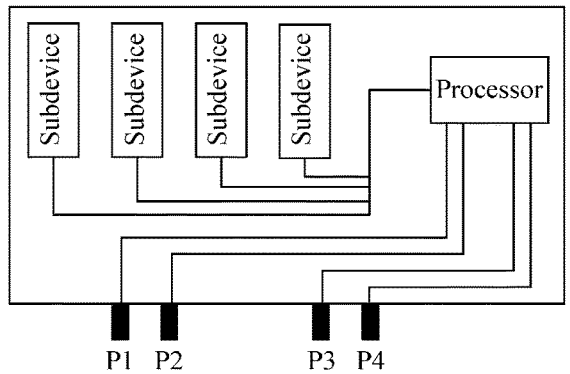
FIG. 4 is a schematic diagram of a container antenna line device according to an embodiment of the present application.

In this embodiment, the primary device is a device managing the antenna line device. The primary device needs to know antenna line devices managed by the primary device. The primary device may send a scanning command to the antenna line device. The scanning command is used to scan the antenna line device. After receiving the scanning command, the antenna line device sends a scanning response to the primary device. The scanning response includes indication information used to indicate a type of the antenna line device. The type of the antenna line device is a container antenna line device. The container antenna line device has a capability of managing multiple subdevices. In addition, connection lines between all ports of the container antenna line device and a processor of the antenna line device are different from each other. That is, the connection lines between the ports and the processor of the antenna line device are independent from each other. In other words, all the ports are independent from each other, and there is no direct information exchange between the ports. That is, the processor needs to exchange information between the ports. As shown in FIG. 4, in an example, the container antenna line device has four ports: ports P1, P2, P3, and P4, connection lines between the ports and the processor are independent from each other, and the ports are independent from each other.

Specifically, the scanning command has an expected sequence number and a corresponding mask. After receiving the scanning command, the antenna line device performs computation by using a sequence number of the antenna line device and the received mask, to obtain a result. When the result is the same as the sequence number in the scanning command, the antenna line device sends a scanning response to the primary device.

S103. The primary device sends a High-Level Data Link Control (HDLC for short) address assignment command to the antenna line device, where the HDLC address assignment command includes an HDLC address assigned by the primary device to the antenna line device.

S104. The primary device establishes a communication link to the antenna line device according to the HDLC address.

In this embodiment, after receiving the scanning response sent by the antenna line device, the primary device may know that the primary device has obtained the antenna line device through scanning. The primary device then assigns an HDLC address to the antenna line device, adds the HDLC address to an HDLC address assignment command, and sends the HDLC address assignment command to the antenna line device. After the antenna line device receives the HDLC address assignment command, the primary device establishes the communication link to the antenna line device according to the HDLC address.

S105. The primary device sends a capability information query command to the antenna line device.

S106. The primary device receives a capability information report sent by the antenna line device, where the capability information report includes function information of each of N subdevices managed by the antenna line device, where N is an integer greater than or equal to 0.

S107. The primary device manages the N subdevices according to the capability information report.

In this embodiment, after establishing the communication link to the antenna line device, the primary device sends, by using the communication link, a capability information query command to the antenna line device according to a fact that the antenna line device is a container antenna line device. After receiving the capability information query command, the antenna line device sends a capability information report to the primary device. The capability information report includes function information of each of the N subdevices managed by the antenna line device. The function information of the subdevices may be, for example, remote electrical tilt, RAE, a tower mounted amplifier (TMA for short), azimuth query, temperature query, geographical location query, and height query. After receiving the capability information report sent by the antenna line device, the primary device manages the subdevices according to the capability information report. That is, the primary device manages the subdevices according to function information of the subdevices.

According to the antenna line device management method provided in this embodiment of the present application, after obtaining a container antenna line device through scanning, a primary device establishes a communication link to the antenna line device, then sends a capability information query command to the antenna line device according to a fact that the antenna line device is the container antenna line device, so as to obtain function information of subdevices managed by the antenna line device, and then manages the subdevices. Therefore, the primary device may establish a communication connection to the container antenna line device, so that the primary device can manage a subdevice (for example, an antenna line device cascaded with the container antenna line device) managed by the container antenna line device, thereby reducing complexity of managing an antenna line device by a primary device.

Figure 5:
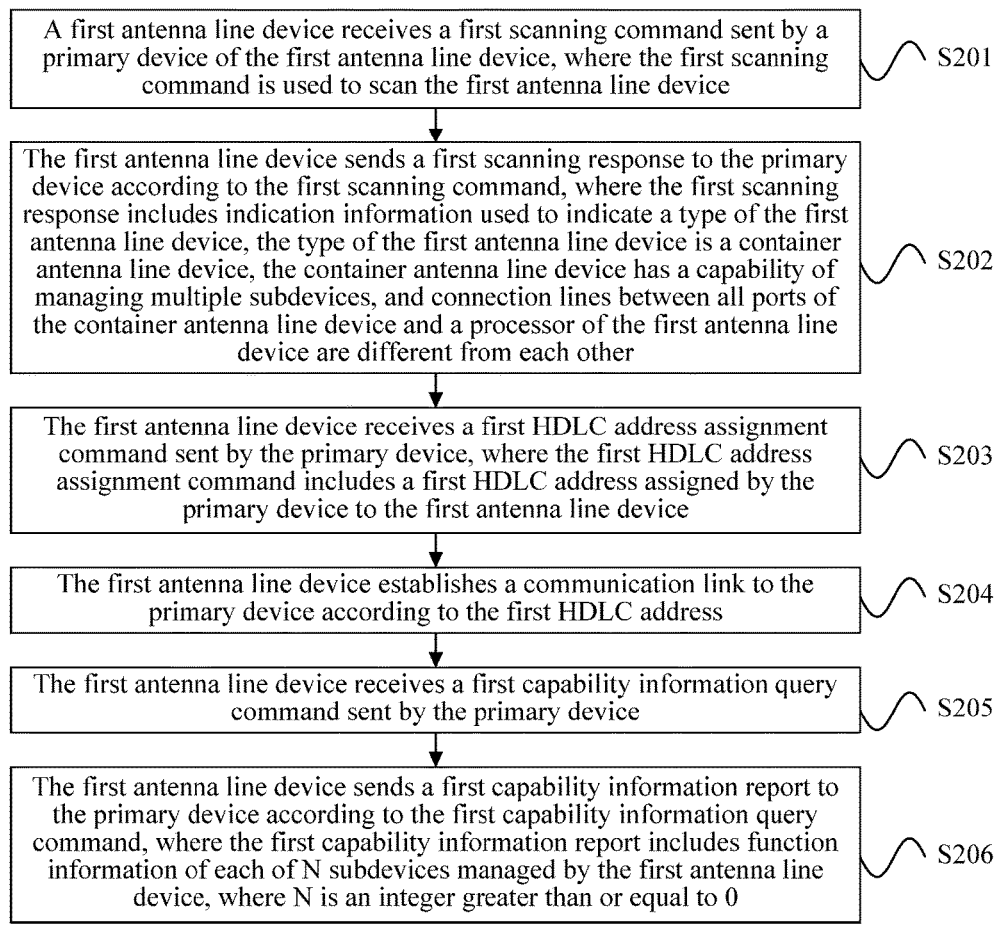
FIG. 5 is a flowchart of Embodiment 2 of an antenna line device management method according to the present application.

FIG. 5 is a flowchart of Embodiment 2 of an antenna line device management method according to the present application. As shown in FIG. 5, the method in this embodiment may include the following steps.

S201. A first antenna line device receives a first scanning command sent by a primary device of the first antenna line device, where the first scanning command is used to scan the first antenna line device.

S202. The first antenna line device sends a first scanning response to the primary device according to the first scanning command, where the first scanning response includes indication information used to indicate a type of the first antenna line device, the type of the first antenna line device is a container antenna line device, the container antenna line device has a capability of managing multiple subdevices, and connection lines between all ports of the container antenna line device and a processor of the first antenna line device are different from each other.

In this embodiment, the primary device is a device managing the first antenna line device. The first antenna line device receives a first scanning command sent by the primary device. The first scanning command is used to scan the first antenna line device. The first antenna line device sends a first scanning response to the primary device according to the first scanning command. The first scanning response includes indication information used to indicate a type of the first antenna line device. The type of the first antenna line device is a container antenna line device. The container antenna line device has a capability of managing multiple subdevices. In addition, connection lines between all ports of the container antenna line device and a processor of the first antenna line device are different from each other. That is, the connection lines between the ports and the processor of the first antenna line device are independent from each other. In other words, the ports are independent from each other, as shown in FIG. 4.

Specifically, the first scanning command has an expected sequence number and a corresponding mask. After receiving the scanning command, the first antenna line device performs computation by using a sequence number of the first antenna line device and the received mask, to obtain a result. When the result is the same as the sequence number in the first scanning command, the first antenna line device sends a scanning response to the primary device.

S203. The first antenna line device receives a first HDLC address assignment command sent by the primary device, where the first HDLC address assignment command includes a first HDLC address assigned by the primary device to the first antenna line device.

S204. The first antenna line device establishes a communication link to the primary device according to the first HDLC address.

In this embodiment, after the first antenna line device sends the first scanning response to the primary device, the primary device may know that the first antenna line device is obtained through scanning. The primary device then assigns a first HDLC address to the first antenna line device, adds the first HDLC address to a first HDLC address assignment command, and sends the first HDLC address assignment command to the first antenna line device. After receiving the first HDLC address assignment command, the first antenna line device establishes a communication link to the primary device according to the first HDLC address.

S205. The first antenna line device receives a first capability information query command sent by the primary device.

S206. The first antenna line device sends a first capability information report to the primary device according to the first capability information query command, where the first capability information report includes function information of each of N subdevices managed by the first antenna line device, where N is an integer greater than or equal to 0.

In this embodiment, after the first antenna line device establishes a communication link to the primary device, the primary device sends, by using the communication link, a first capability information query command to the first antenna line device according to a fact that the first antenna line device is a container antenna line device. After receiving the first capability information query command, the first antenna line device sends a first capability information report to the primary device. The first capability information report includes function information of each of the N subdevices managed by the first antenna line device. N is an integer greater than or equal to 0. The function information of the subdevices may be, for example, remote electrical tilt, RAE, a TMA, azimuth query, temperature query, geographical location query, and height query. In this way, after receiving the first capability information report sent by the first antenna line device, the primary device manages the subdevices according to the first capability information report. That is, the primary device manages the subdevices according to function information of the subdevices.

According to the antenna line device management method provided in this embodiment of the present application, after a first antenna line device that is a container antenna line device is obtained through scanning by a primary device, the first antenna line device establishes a communication link to the primary device, then receives a first capability information query command that is sent by the primary device according to a fact that the first antenna line device is a container antenna line device, and then notifies the primary device of function information of subdevices managed by the first antenna line device, so that the primary device can manage the subdevices. Therefore, the primary device may establish a communication connection to the container antenna line device, so that the primary device can manage a subdevice (for example, an antenna line device cascaded with the container antenna line device) managed by the container antenna line device, thereby reducing complexity of managing an antenna line device by a primary device.

Figure 6:
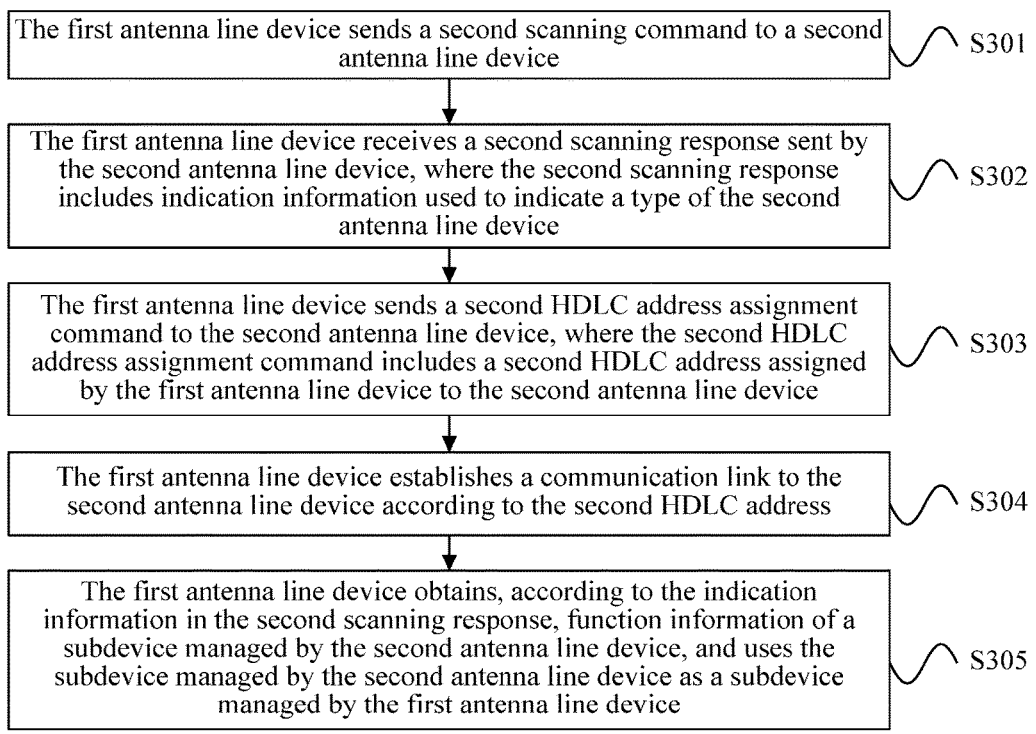
FIG. 6 is a flowchart of Embodiment 3 of an antenna line device management method according to the present application.

FIG. 6 is a flowchart of Embodiment 3 of an antenna line device management method according to the present application. As shown in FIG. 6, based on the embodiment shown in FIG. 5, the method in this embodiment may further include the following steps.

S301. The first antenna line device sends a second scanning command to a second antenna line device.

In this embodiment, the second antenna line device is any antenna line device cascaded with the first antenna line device. The second scanning command is used to scan the second antenna line device. Herein, the first antenna line device is an antenna line device managing the second antenna line device, that is, a primary device of the second antenna line device. For a specific implementation process, refer to related descriptions in Method Embodiment 1 of the present application. Details are not described herein again.

S302. The first antenna line device receives a second scanning response sent by the second antenna line device, where the second scanning response includes indication information used to indicate a type of the second antenna line device.

In this embodiment, after receiving the second scanning command sent by the first antenna line device, the second antenna line device sends a second scanning response to the first antenna line device. The second scanning response includes indication information used to indicate a type of the second antenna line device. For example, the indication information may indicate that the second antenna line device is a single-remote electrical tilt (Single-RET for short) device, a remote antenna extension (RAE for short) device, an alignment sensor device (ASD for short), a multi-remote electrical tilt (Multi-RET for short) device, or a container antenna line device.

S303. The first antenna line device sends a second HDLC address assignment command to the second antenna line device, where the second HDLC address assignment command includes a second HDLC address assigned by the first antenna line device to the second antenna line device.

S304. The first antenna line device establishes a communication link to the second antenna line device according to the second HDLC address.

In this embodiment, after receiving the second scanning response sent by the second antenna line device, the first antenna line device may know that the second antenna line device is obtained through scanning. The first antenna line device then assigns an HDLC address to the second antenna line device, where the HDLC address herein is referred to as a second HDLC address, adds the second HDLC address to a second HDLC address assignment command, and sends the second HDLC address assignment command to the second antenna line device. After the second antenna line device receives the second HDLC address assignment command, the first antenna line device establishes a communication link to the second antenna line device according to the second HDLC address.

S305. The first antenna line device obtains, according to the indication information in the second scanning response, function information of a subdevice managed by the second antenna line device, and uses the subdevice managed by the second antenna line device as a subdevice managed by the first antenna line device.

In this embodiment, the first antenna line device may obtain, according to the indication information used to indicate the type of the second antenna line device in the second scanning response, a subdevice managed by the second antenna line device and function information of the subdevice, and uses the subdevice managed by the second antenna line device as a subdevice managed by the first antenna line device.

When the indication information in the second scanning response indicates that the type of the second antenna line device is a container antenna line device, the obtaining, by the first antenna line device according to the indication information in the second scanning response, function information of a subdevice managed by the second antenna line device is specifically: sending, by the first antenna line device, a second capability information query command to the second antenna line device, and receiving a second capability information report sent by the second antenna line device. The second capability information report includes function information of K subdevices managed by the second antenna line device, and K is an integer greater than or equal to 0. The first antenna line device sends, by using the communication link between the first antenna line device and the second antenna line device, a second capability information query command to the second antenna line device according to a fact that the second antenna line device is a container antenna line device. After receiving the second capability information query command, the second antenna line device sends a second capability information report to the first antenna line device. The second capability information report includes function information of each of the K subdevices managed by the second antenna line device. The function information of the subdevices may be, for example, remote electrical tilt, RAE, a TMA, azimuth query, temperature query, geographical location query, and height query. In this way, the first antenna line device can obtain the function information of each of the K subdevices managed by the second antenna line device from the second capability information report.

When the indication information in the second scanning response indicates that the type of the second antenna line device is a non-container antenna line device, for example, a Single-RET device, an RAE device, an ASD, or a Multi-RET device, the first antenna line device obtains, according to the type of the second antenna line device, function information of a subdevice managed by the second antenna line device, and uses the subdevice managed by the second antenna line device as a subdevice managed by the first antenna line device.

According to the antenna line device management method provided in this embodiment, the first antenna line device can be used as a secondary device of a primary device, or a primary device of a second antenna line device. Because the first antenna line device can obtain a type of any antenna line device cascaded with the first antenna line device and a subdevice managed by the any antenna line device, the primary device can establish a communication connection to the first antenna line device, and then can manage the subdevice (for example, an antenna line device cascaded with the first antenna line device) managed by the first antenna line device, thereby reducing complexity of managing an antenna line device by a primary device.

Figure 7:
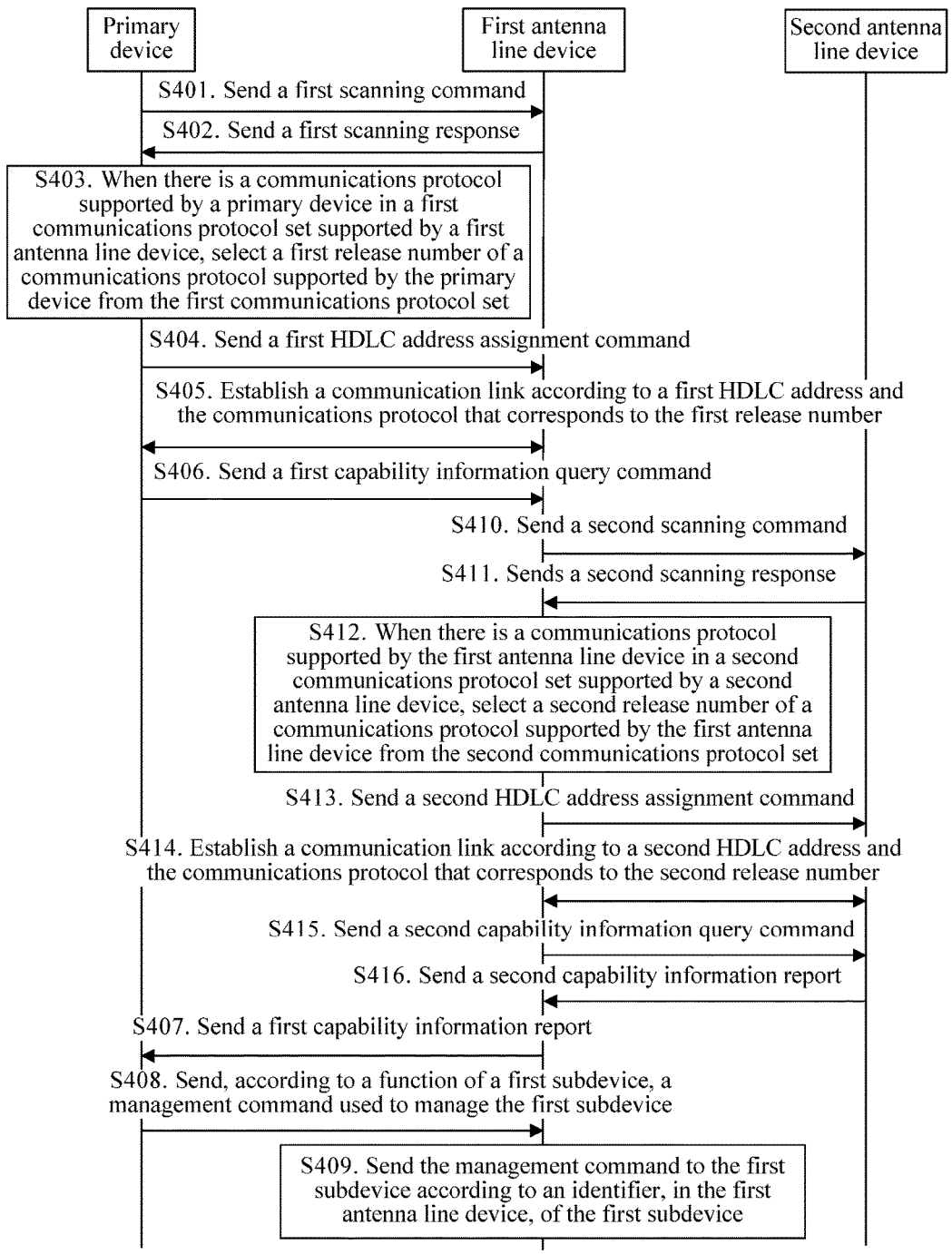
FIG. 7 is a flowchart of Embodiment 4 of an antenna line device management method according to the present application.

FIG. 7 is a flowchart of Embodiment 4 of an antenna line device management method according to the present application. As shown in FIG. 7, the method in this embodiment may include the following steps.

S401. A primary device sends a first scanning command to a first antenna line device.

In this embodiment, for a specific implementation process of S401, refer to related descriptions of S101 in Method Embodiment 1 of the present application. Details are not described herein again.

S402. The first antenna line device sends a first scanning response to the primary device.

In this embodiment, the first scanning response includes indication information used to indicate a type of the first antenna line device and a communications protocol set supported by the first antenna line device. Herein, the communications protocol set supported by the first antenna line device is referred to as a first communications protocol set. The first communications protocol set includes a release number (for example, 1.1, 2.0, or 3.0) of each communications protocol supported by the first antenna line device. In this embodiment, the type of the first antenna line device is a container antenna line device. For descriptions of the container antenna line device, refer to related descriptions in Method Embodiment 1 of the present application.

S403. When there is a communications protocol supported by the primary device in the first communications protocol set supported by the first antenna line device, the primary device selects a first release number of a communications protocol supported by the primary device from the first communications protocol set.

In this embodiment, after receiving the first scanning response sent by the first antenna line device, the primary device obtains the first communications protocol set supported by the first antenna line device from the first scanning response, and searches the first communications protocol set, to determine whether there is a communications protocol supported by the primary device in the first communications protocol set. When there is a communications protocol supported by the primary device in the first communications protocol set, the primary device selects, from the communications protocol supported by the primary device in the first communications protocol set, a release number of a communications protocol supported by the primary device. The release number selected by the primary device is referred to as a first release number. For example, if the first communications protocol set includes release numbers 1.1, 2.0, 3.0, and the like, and release numbers of a communications protocol supported by the primary device include 2.0 and 3.0, the primary device may select the release number 2.0 or the release number 3.0. When there is no communications protocol supported by the primary device in the first communications protocol set, the primary device sends a failure report to a network administrator. The failure report is used to indicate that the primary device does not support management of the first antenna line device.

S404. The primary device sends a first HDLC address assignment command to the first antenna line device.

In this embodiment, the first HDLC address assignment command includes an HDLC address assigned by the primary device to the first antenna line device and the first release number of the communications protocol that is selected by the primary device. The HDLC address assigned by the primary device to the first antenna line device is referred to as a first HDLC address.

S405. The primary device establishes a communication link to the first antenna line device according to the first HDLC address and the communications protocol that corresponds to the first release number.

In this embodiment, after the first antenna line device receives the first HDLC address assignment command that is sent by the primary device and that includes the first HDLC address and the first release number of the communications protocol that is selected by the primary device from the first communications protocol set, the primary device establishes a communication link to the first antenna line device according to the first HDLC address and the communications protocol that corresponds to the first release number. Subsequently, the primary device may communicate with the first antenna line device based on the communications protocol that corresponds to the first release number.

S406. The primary device sends a first capability information query command to the first antenna line device.

In this embodiment, a specific implementation manner of S306 is similar to a specific implementation manner of S105 in Method Embodiment 1 of the present application. Details are not described herein again.

S407. The first antenna line device sends a first capability information report to the primary device.

In this embodiment, the first antenna line device sends a first capability information report to the primary device according to the first capability information query command. The first capability information report includes function information of N subdevices managed by the first antenna line device and identifiers, in the first antenna line device, of the N subdevices managed by the first antenna line device, where N is an integer greater than or equal to 0. For example, the first antenna line device manages N subdevices, and identifiers of the subdevices are separately: subdevice 1, subdevice 2, subdevice 3, . . . , and subdevice N. Therefore, the first capability information may include: subdevice 1: function information, subdevice 2: function information, subdevice 3: function information, . . . , and subdevice N: function information. It should be noted that the N subdevices managed by the first antenna line device include a subdevice disposed in the first antenna line device and a subdevice disposed in an antenna line device cascaded with the first antenna line device. After receiving the first capability information report sent by the first antenna line device, the primary device may manage the N subdevices. A specific management process is shown as follows.

S408. The primary device sends, according to a function of a first subdevice, a management command used to manage the first subdevice to the first antenna line device.

In this embodiment, after receiving the first capability information report sent by the first antenna line device, the primary device determines a function supported by each of the N subdevices managed by the first antenna line device, and then performs different management on the subdevices according to different functions supported by the subdevices. Specifically, the foregoing first subdevice is any one of the N subdevices managed by the first antenna line device. The first subdevice is a device on which the base station is to perform a management action currently. The primary device may send a management command used to manage the first subdevice to the first antenna line device. The management command includes an identifier, in the first antenna line device, of the first subdevice.

S409. The first antenna line device sends the management command to the first subdevice according to the identifier, in the first antenna line device, of the first subdevice.

In this embodiment, after receiving the management command that is sent by the primary device and that is used to manage the first subdevice, the first antenna line device obtains the identifier, in the first antenna line device, of the first subdevice from the management command, and sends the management command to the first subdevice, so that after receiving the management command, the first subdevice performs, according to the management command, an operation indicated by the management command.

Specifically, when the first subdevice is a subdevice disposed in the first antenna line device, if a CPU of the first antenna line device and a CPU of the first subdevice are a same CPU, the first antenna line device performs, on the first subdevice according to the management command, a management operation corresponding to the management command. If the CPU of the first antenna line device and the CPU of the first subdevice are not a same CPU, the CPU of the first antenna line device sends the management command to the CPU of the first subdevice, so that the CPU of the first subdevice performs, according to the management command, a management operation corresponding to the management command.

When the first subdevice is disposed in another antenna line device other than the first antenna line device, in this case, the another antenna line device is referred to as the second antenna line device. The first antenna line device performs format conversion on the management command according to the type of the second antenna line device and a communications protocol for communication between the first antenna line device and the second antenna line device, and then sends the management command after the format conversion to the second antenna line device. If the second antenna line device is a container antenna line device, an identifier, in the first antenna line device, of the first subdevice of the first antenna line device is converted into an identifier, in the second antenna line device, of the first subdevice. The identifier, in the first antenna line device, of the first subdevice in the management command is replaced with the identifier, in the second antenna line device, of the first subdevice. The management command that complies with a communications protocol for communication between the primary device and the first antenna line device is converted into a management command that complies with the communications protocol for communication between the first antenna line device and the second antenna line device. The management command after the conversion is then sent to the second antenna line device. If the second antenna line device is not a container antenna line device, the first antenna line device deletes, from the management command, the identifier, in the first antenna line device, of the first subdevice, converts the management command that complies with the communications protocol for communication between the primary device and the first antenna line device into a management command that complies with the communications protocol for communication between the first antenna line device and the second antenna line device, and then sends the management command after the conversion to the second antenna line device.

According to the antenna line device management method provided in this embodiment of the present application, when a primary device obtains, through scanning, a first antenna line device that is a container antenna line device, the first antenna line device reports, to the primary device, a first communications protocol set supported by the first antenna line device. The primary device then selects a communications protocol from the first communications protocol set, and establishes, based on the communications protocol, a communication link to the first antenna line device, so that a result of negotiating a release of a communications protocol is achieved, and the primary device can be well compatible with the first antenna line device that is used as a secondary device. The primary device then sends a first capability information query command to the first antenna line device according to a fact that the first antenna line device is a container antenna line device, so as to obtain function information of subdevices managed by the first antenna line device, and then manages the subdevices. Therefore, the primary device may establish a communication connection to the container antenna line device, so that the primary device can manage a subdevice (for example, an antenna line device cascaded with the container antenna line device) managed by the container antenna line device, thereby reducing complexity of managing an antenna line device by a primary device.

Optionally, when the second antenna line device is a container antenna line device, the method in this embodiment may further include the following steps.

S410. The first antenna line device sends a second scanning command to a second antenna line device.

In this embodiment, for a specific implementation process of S401, refer to related descriptions of S301 in Method Embodiment 1 of the present application. Details are not described herein again.

S411. The second antenna line device sends a second scanning response to the first antenna line device.

In this embodiment, the second scanning response includes indication information used to indicate a type of the second antenna line device and a communications protocol set supported by the second antenna line device. Herein, the communications protocol set supported by the first antenna line device is referred to as a second communications protocol set. The second communications protocol set includes a release number (for example, 1.1, 2.0, or 3.0) of each communications protocol supported by the second antenna line device. In this embodiment, the type of the second antenna line device is a container antenna line device. For descriptions of the container antenna line device, refer to related descriptions in Method Embodiment 1 of the present application.

S412. When there is a communications protocol supported by the first antenna line device in the second communications protocol set supported by the second antenna line device, the first antenna line device selects a second release number of a communications protocol supported by the first antenna line device from the second communications protocol set.

In this embodiment, after receiving the second scanning response sent by the second antenna line device, the first antenna line device obtains the second communications protocol set supported by the second antenna line device from the second scanning response, and searches the second communications protocol set, to determine whether there is a communications protocol supported by the first antenna line device in the second communications protocol set. When there is a communications protocol supported by the first antenna line device in the second communications protocol set, the first antenna line device selects, from the communications protocol supported by the first antenna line device in the second communications protocol set, a release number of a communications protocol supported by the first antenna line device. The release number selected by the first antenna line device is referred to as a second release number. For example, if the second communications protocol set includes release numbers 1.1, 2.0, 3.0, and the like, and release numbers of a communications protocol supported by the first antenna line device include 2.0 and 3.0, the first antenna line device may select the release number 2.0 or the release number 3.0.

S413. The first antenna line device sends a second HDLC address assignment command to the second antenna line device.

In this embodiment, the second HDLC address assignment command includes an HDLC address assigned by the first antenna line device to the second antenna line device and the second release number of the communications protocol that is selected by the first antenna line device. The HDLC address assigned by the first antenna line device to the second antenna line device is referred to as a second HDLC address.

S414. The first antenna line device establishes a communication link to the second antenna line device according to the second HDLC address and the communications protocol that corresponds to the second release number.

In this embodiment, after the second antenna line device receives the second HDLC address assignment command that is sent by the first antenna line device and that includes the second HDLC address and the second release number of the communications protocol that is selected by the first antenna line device from the second communications protocol set, the first antenna line device establishes a communication link to the second antenna line device according to the second HDLC address and the communications protocol that corresponds to the second release number. Subsequently, the first antenna line device may communicate with the second antenna line device based on the communications protocol that corresponds to the second release number.

Optionally, the foregoing first release number may be the same as the second release number. Alternatively, the first release number may be different from the second release number. Therefore, the first antenna line device may communicate with the primary device and the second antenna line device by using communications protocols of different releases.

S415. The first antenna line device sends a second capability information query command to the second antenna line device.

S416. The second antenna line device sends a second capability information report to the first antenna line device.

In this embodiment, when the second antenna line device is a container antenna line device, the first antenna line device sends a second capability information query command to the second antenna line device. After receiving the second capability information query command, the second antenna line device sends a second capability information report to the first antenna line device according to the second capability information query command. The second capability information report includes function information of K subdevices managed by the second antenna line device and identifiers, in the second antenna line device, of the K subdevices managed by the second antenna line device, where K is an integer greater than or equal to 0. For example, the second antenna line device manages K subdevices, and identifiers of the subdevices are separately: subdevice 1, subdevice 2, subdevice 3, . . . , and subdevice K. Therefore, the second capability information report may include: subdevice 1: function information, subdevice 2: function information, subdevice 3: function information, . . . , and subdevice K: function information. The first antenna line device then uses the K subdevices managed by the second antenna line device as subdevices managed by the first antenna line device, and then assigns identifiers, in the first antenna line device, of the K subdevices to the K subdevices. In order to facilitate sending of the management command of managing the K subdevices to the second antenna line device, the first antenna line device further establishes a correspondence between the identifiers, in the first antenna line device, of the K subdevices and the identifiers, in the second antenna line device, of the K subdevices, so that the first antenna line device can convert an identifier, in the first antenna line device, of a subdevice in the management command into an identifier, in the second antenna line device, of the subdevice. It should be noted that the K subdevices managed by the second antenna line device include a subdevice disposed in the second antenna line device and a subdevice disposed in an antenna line device cascaded with the second antenna line device. After receiving the second capability information report sent by the second antenna line device, the first antenna line device may manage the K subdevices. For a specific management process, refer to related descriptions in S409. Details are not described herein again.

Optionally, when the second antenna line device is a non-container antenna line device, the method in this embodiment may further include: sending, by the first antenna line device, a second scanning command to the second antenna line device, and sending, by the second antenna line device, a second scanning response to the first antenna line device. Indication information in the second scanning response indicates that the type of the second antenna line device is, for example, a Single-RET device, an RAE device, an ASD, or a Multi-RET device. The second antenna line device may obtain a release number of a communications protocol of the second antenna line device according to the type of the second antenna line device. The first antenna line device may further assign a second HDLC address to the second antenna line device, then send a second HDLC address assignment command to the second antenna line device, and establish a communication link according to the second HDLC address and the communications protocol of the second antenna line device. The first antenna line device may further obtain, according to the type of the second antenna line device, function information of a subdevice managed by the second antenna line device, and use the subdevice managed by the second antenna line device as a subdevice managed by the first antenna line device. The first antenna line device then assigns an identifier, in the first antenna line device, of the subdevice to the subdevice managed by the second antenna line device, and establishes a correspondence between the identifier, in the first antenna line device, of the subdevice and the identifier in the second antenna line device, so that the first antenna line device can forward the management command to the second antenna line device according to the identifier, in the first antenna line device, of the subdevice in the management command.

Figure 8:
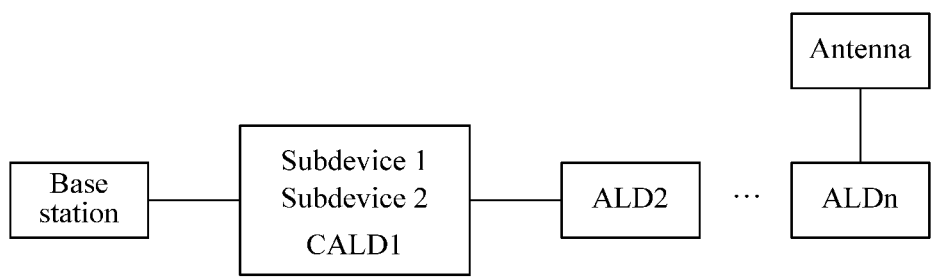
FIG. 8 is a first schematic diagram of physical connections between an antenna line device and a base station and between an antenna line device and an antenna according to an embodiment of the present application.
Figure 9:
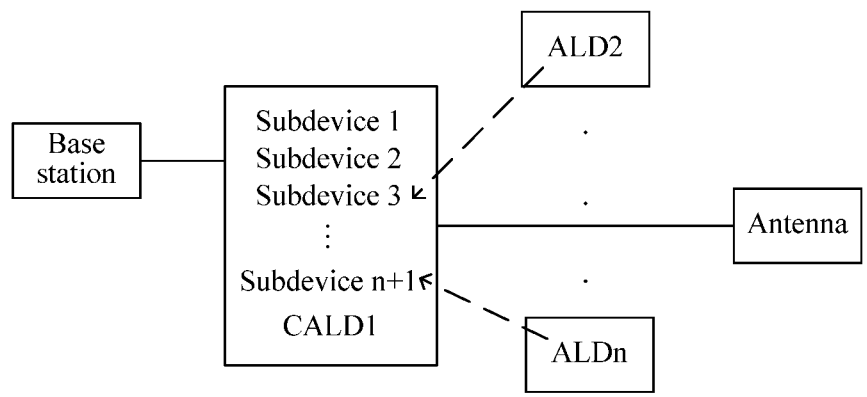
FIG. 9 is a first schematic diagram of logical connections between an antenna line device and a base station and between an antenna line device and an antenna according to an embodiment of the present application.

This embodiment of the present application is described in detail below by using examples. In a first feasible implementation manner, as shown in FIG. 8, the primary device is a base station, and the first antenna line device is a container antenna line device (CALD for short). That is, for a CALD1 shown in FIG. 8, two subdevices are disposed in the CALD1, and identifiers, in the CALD1, of the two subdevices are separately: subdevice 1 and subdevice 2. Each antenna line device cascaded with the CALD1 is a non-container antenna line device. The CALD1 may obtain the ALD2, . . . , and ALDn through scanning, and separately establish communication connections to the ALD2, . . . , and the ALDn. The CALD1 may use the ALD2, . . . , and the ALDn as subdevices managed by the CALD1. The CALD1 assigns subdevice 3, . . . , and subdevice n+1 respectively as identifiers, in the CALD1, of the ALD2, . . . , and the ALDn. As shown in FIG. 9, the base station can manage the ALD2, . . . , and the ALDn by establishing a communication connection to only the CALD1.

Figure 10:
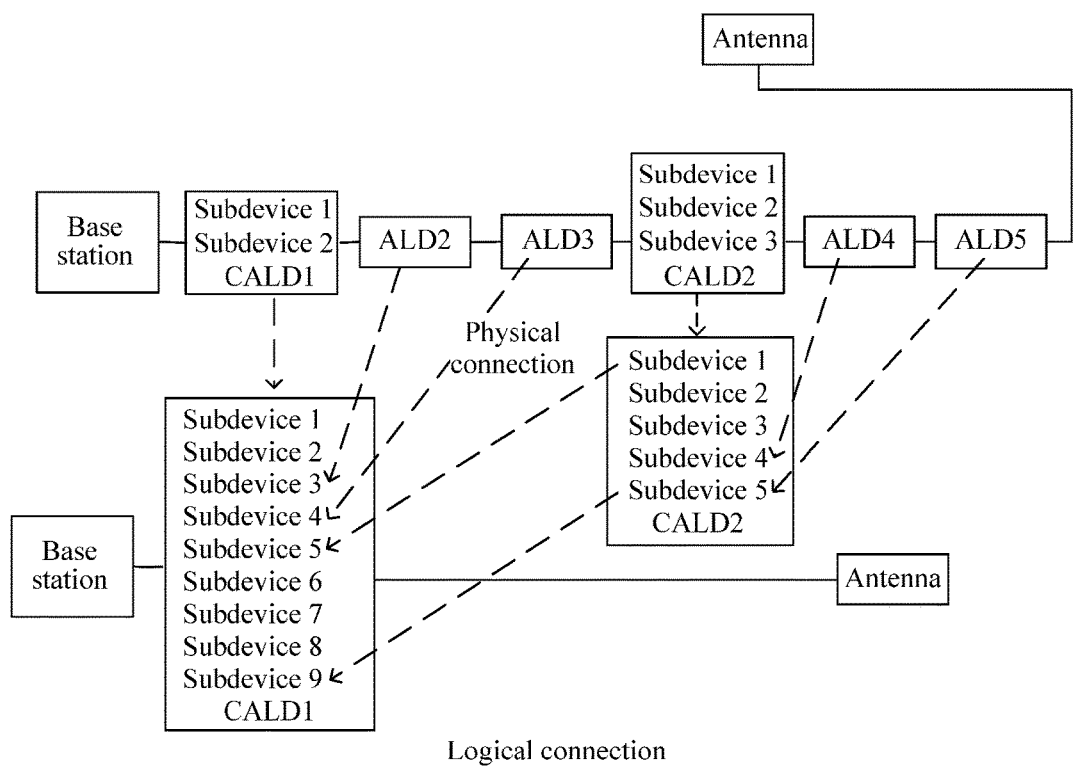
FIG. 10 is a second schematic diagram of physical connections and logical connections between an antenna line device and a base station and between an antenna line device and an antenna according to an embodiment of the present application.

In a second feasible implementation manner, as shown in FIG. 10, the primary device is a base station, and the first antenna line device is a container antenna line device. That is, for a CALD1 shown in FIG. 10, a subdevice 1 and a subdevice 2 are disposed in the CALD1. Antenna line devices cascaded with the CALD1 include a container antenna line device (that is, a CALD2 shown in FIG. 10) and a non-container antenna line device. The CALD1 may obtain the ALD2, an ALD3, and a CALD2 through scanning, and separately establish communication connections to the ALD2, the ALD3, and the CALD2. The CALD1 may use subdevices managed by the ALD2, the ALD3, and the CALD2 as subdevices managed by the CALD1. The CALD2 includes three subdevices. Identifiers, in the CALD2, of the three subdevices are separately: subdevice 1, subdevice 2, and subdevice 3, and the antenna line devices cascaded with the CALD2 are an ALD4 and an ALD5. The CALD2 may obtain the ALD4 and the ALD through scanning, and separately establish communication connection to the ALD4 and the ALD5. The CALD2 may use the ALD4 and the ALD as subdevices managed by the CALD2. The CALD2 assigns respectively subdevice 4 and subdevice 5 as identifiers, in the CALD3, of the ALD4 and the ALD5. The CALD1 may further assign subdevice 3 as an identifier, in the CALD1, of the ALD2, assign subdevice 4 as an identifier, in the CALD1, of the ALD3, and assign subdevice 5, subdevice 6, subdevice 7, subdevice 8, and subdevice 9 respectively as identifiers, in the CALD1, of five subdevices managed by the CALD2. The base station can manage the foregoing nine subdevices by establishing a communication connection to only the CALD1. The CALD1 can manage the two subdevices in the CALD2, the ALD4, and the ALD5 by establishing a communication connection to the CALD2.

Figure 11:
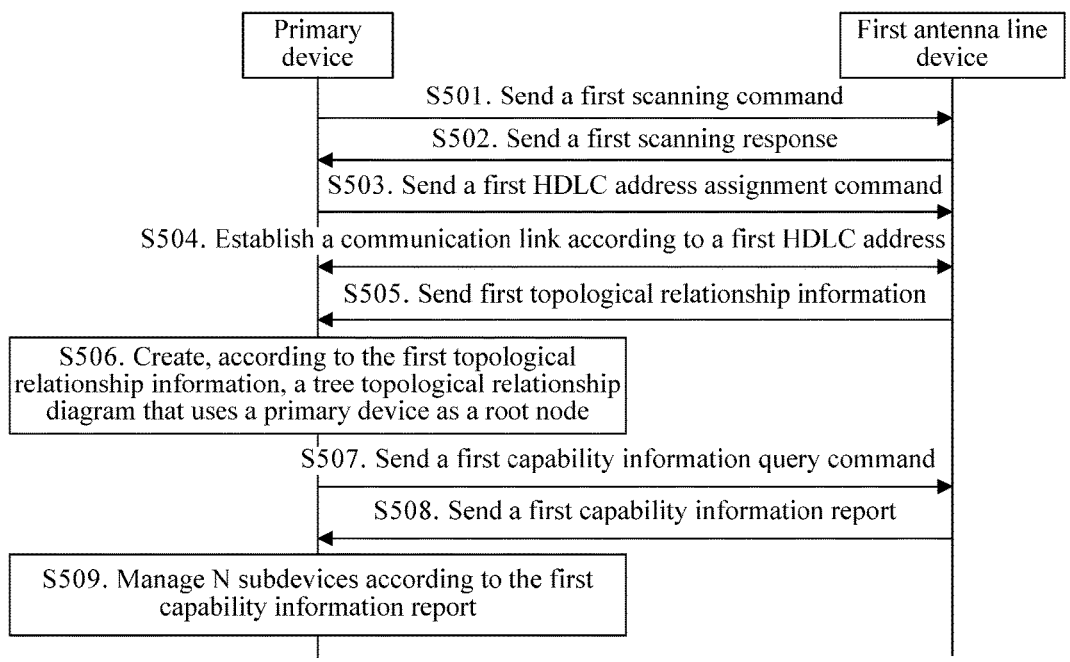
FIG. 11 is a flowchart of Embodiment 5 of an antenna line device management method according to the present application.

FIG. 11 is a flowchart of Embodiment 5 of an antenna line device management method according to the present application. As shown in FIG. 11, the method in this embodiment may include the following steps.

S501. A primary device sends a first scanning command to a first antenna line device.

S502. The first antenna line device sends a first scanning response to the primary device.

S503. The primary device sends a first HDLC address assignment command to the first antenna line device.

S504. The primary device establishes a communication link to the first antenna line device according to the first HDLC address.

S505. The first antenna line device sends first topological relationship information to the primary device.

In this embodiment, the first topological relationship information is used to indicate antenna line devices sequentially connected to each of all ports of the first antenna line device. For example, the first topological relationship information is used to indicate that RAE1, an ASD1, and a container antenna line device 1 are sequentially connected to a first port of the first antenna line device, and a container antenna line device 2, an ASD2, and RAE2 are sequentially connected to a second port.

Optionally, after the first antenna line device establishes a communication link to a second antenna line device cascaded with the first antenna line device, the second antenna line device sends second topological relationship information to the first antenna line device. The second topological relationship information is used to indicate antenna line devices sequentially connected to each of all ports of the second antenna line device. Herein, the first port of the first antenna line device is connected to the second antenna line device. The first antenna line device then obtains and determines that an antenna line device that is first connected to the first port is the second antenna line device, and then uses, as antenna line devices sequentially connected to the first port of the first antenna line device, the second antenna line device that is first connected to the first port and antenna line devices that are sequentially connected to each of all ports of the second antenna line device. It should be noted that the first port may be any port of the first antenna line device. Processing is performed on each port of the first antenna line device according to a processing manner of the first port. The first antenna line device may obtain the antenna line devices that are sequentially connected to each of all the ports of the first antenna line device. The first antenna line device then sends the first topological relationship information to the primary device.

S506. The primary device creates, according to the first topological relationship information, a tree topological relationship diagram that uses the primary device as a root node.

In this embodiment, after receiving the first topological relationship information sent by the first antenna line device, the primary device may create, according to the first topological relationship information, a tree topological relationship diagram that uses the primary device as a root node. An antenna line device that is first connected to the primary device includes the first antenna line device.

Optionally, the tree topological relationship diagram includes the star topological relationship diagram and/or a chain topological relationship diagram.

It should be noted that S505 and S506 only need to be performed after S504, and an order of performing S505 and S506 and performing S507 to S509 is not limited.

S507. The primary device sends a first capability information query command to the first antenna line device.

S508. The first antenna line device sends a first capability information report to the primary device.

S509. The primary device manages N subdevices according to the first capability information report.

In this embodiment, for a specific implementation process of S507 to S509, refer to related descriptions in the foregoing method embodiments of the present application. Details are not described herein again.

According to the antenna line device management method provided in this embodiment of the present application, further, the first antenna line device can report topological relationship information to the primary device.

Figure 12:
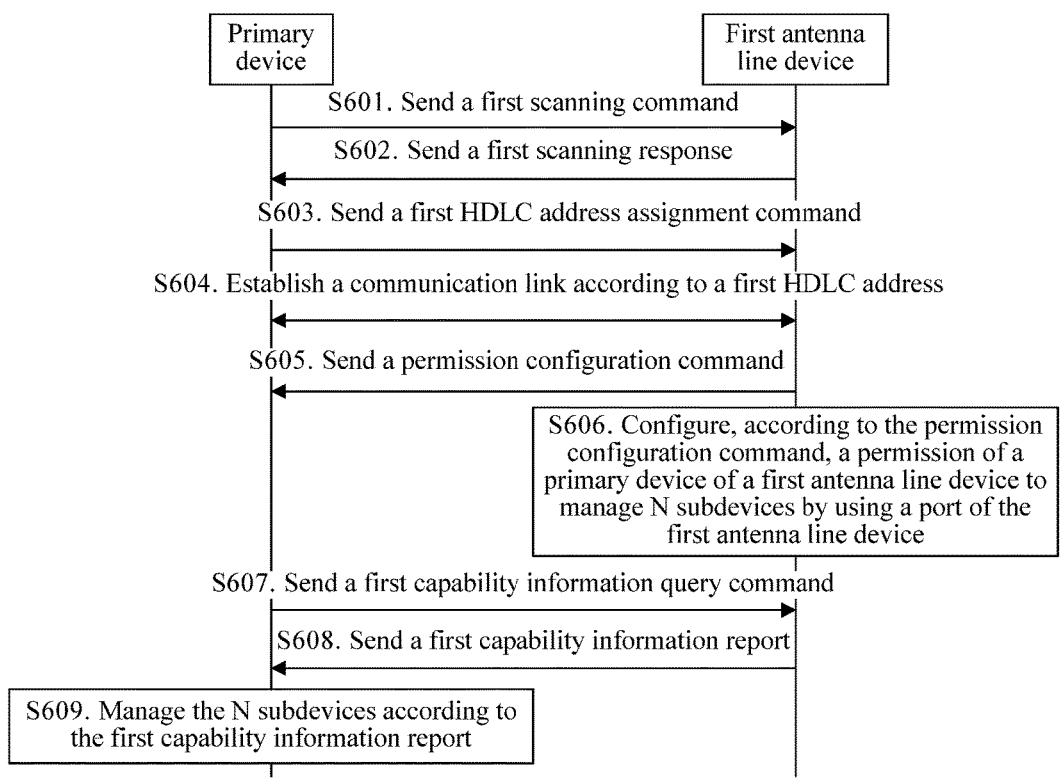
FIG. 12 is a flowchart of Embodiment 6 of an antenna line device management method according to the present application.

FIG. 12 is a flowchart of Embodiment 6 of an antenna line device management method according to the present application. As shown in FIG. 12, the method in this embodiment may include the following steps.

S601. A primary device sends a first scanning command to a first antenna line device.

S602. The first antenna line device sends a first scanning response to the primary device.

S603. The primary device sends a first HDLC address assignment command to the first antenna line device.

S604. The primary device establishes a communication link to the first antenna line device according to the first HDLC address.

S605. The primary device sends a permission configuration command to the first antenna line device.

In this embodiment, the permission configuration command is used to configure a permission of the primary device of the first antenna line device to manage N subdevices by using a port of the antenna line device.

S606. The first antenna line device configures, according to the permission configuration command, a permission of the primary device of the first antenna line device to manage N subdevices by using a port of the first antenna line device.

After receiving the permission configuration command sent by the primary device, the first antenna line device configures the permission of the primary device of the first antenna line device to manage, by using a port of the first antenna line device, subdevices (that is, the foregoing N subdevices) managed by the first antenna line device. For example, the first antenna line device may configure that the primary device of the first antenna line device has a permission to control/write a subdevice 1 by using a port of the first antenna line device, configure that the primary device of the first antenna line device has a permission to query/read a subdevice 2 by using a port of the first antenna line device, and configure that the primary device of the first antenna line device has no permission to manage the first antenna line device and a subdevice 3 by using a port of the first antenna line device, and . . . . It should be noted that the primary device of the first antenna line device includes the foregoing primary device that sends the permission configuration command to the first antenna line device, but is not limited to a primary device that sends a permission configuration command to the first antenna line device.

Figure 13:
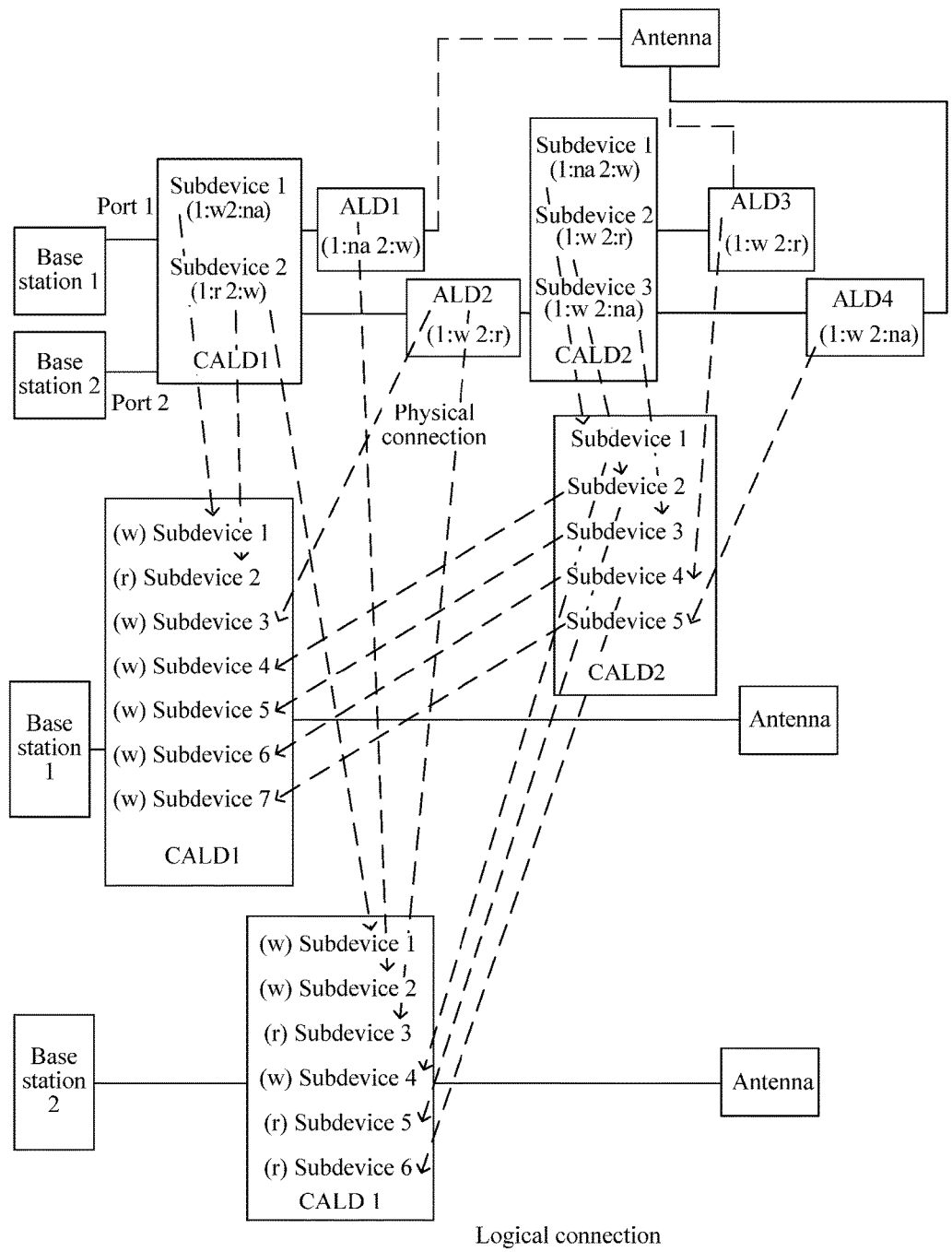
FIG. 13 is a schematic diagram of a permission of a primary device of an antenna line device to manage a subdevice by using a port of the antenna line device according to an embodiment of the present application.

Descriptions are provided in detail below by using an example shown in FIG. 13. As shown in FIG. 13, a first antenna line device is a CALD1, and second antenna line devices are an ALD1, an ALD2, a CALD2, or the like. The CALD1 may manage a subdevice 1 and a subdevice 2 that are disposed in the CALD1, manage the ALD1, manage the ALD2, and manage a subdevice 1 and a subdevice 2 that are disposed in the CALD2. For example, a subdevice 1 (1:w 2:na) shown in FIG. 13 indicates that a primary device of the CALD1 has a permission to control/write the subdevice by using a port 1, and has no permission to manage the subdevice by using a port 2. A subdevice 2 (1:r 2:w) shown in FIG. 13 indicates that the primary device of the CALD1 has a permission to query/read the subdevice by using the port 1, and has a permission to control/write the subdevice by using the port 2. Therefore, after receiving a permission configuration command, the CALD1 may configure that by using the port 1, the primary device of the CALD1 may have a permission to control/write the subdevice 1 in the CALD1, have a permission to query/read the subdevice 2 in the CALD1, have no permission to manage the ALD1, have a permission to control/write the ALD2, have no permission to manage the subdevice 1 in the CALD2, have a permission to control/write the subdevice 2 in the CALD2, have a permission to control/write a subdevice 3 in the CALD2, have a permission to control/write the ALD3, and have a permission to control/write the ALD4. The CALD1 may configure that by using the port 2, the primary device of the CALD1 may have no permission to manage the subdevice 1 in the CALD1, have a permission to control/write the subdevice 2 in the CALD1, have a permission to control/write the ALD1, have a permission to query/read the ALD2, have a permission to control/write the subdevice 1 in the CALD2, have a permission to query/read the subdevice 2 in the CALD2, have no permission to manage the subdevice 3 in the CALD2, have a permission to query/read the ALD3, and have no permission to manage the ALD4. A permission configuration command received by the CALD1 may be sent by a base station 1 shown in FIG. 13, may be sent by a base station 2 shown in FIG. 13, or may be sent by another primary device. When the base station 1 is connected to the port 1 of the CALD1, the base station 1 has a permission to control/write the subdevice 1 in the CALD1, has a permission to query/read the subdevice 2 in the CALD1, has a permission to control/write the ALD2, has a permission to control/write the subdevice 2 in the CALD2, has a permission to control/write the subdevice 3 in the CALD2, has a permission to control/write the ALD3, and has a permission to control/write the ALD4. When the base station 2 is connected to the port 2 of the CALD1, the base station 2 has a permission to control/write the subdevice 2 in the CALD1, has a permission to control/write the ALD1, has a permission to query/read the ALD2, has a permission to control/write the subdevice 2 in the CALD2, has a permission to control/write the subdevice 3 in the CALD2, and has a permission to query/read the ALD3.

It should be noted that S605 and S606 only need to be performed after S604, and an order of performing S605 and S606 and performing S607 to S609 is not limited.

S607. The primary device sends a first capability information query command to the first antenna line device.

S608. The first antenna line device sends a first capability information report to the primary device.

S609. The primary device manages the N subdevices according to the first capability information report.

In this embodiment, for a specific implementation process of S607 to S609, refer to related descriptions in the foregoing method embodiments of the present application. Details are not described herein again.

According to the antenna line device management method provided in this embodiment of the present application, further, the primary device can have a capability of configuring a management permission on a subdevice managed by the first antenna line device, and the primary device can have, by using different ports of the first antenna line device, different management permissions on the subdevice managed by the first antenna line device.

In Embodiment 7 of an antenna line device management method according to the present application, based on the foregoing method embodiments of the present application, a method in this embodiment may further include: after the subdevice managed by the first antenna line device changes (for example, a subdevice is added and/or removed), the first antenna line device may further send a capability information change report to the primary device. The capability information change report includes function information of each of T subdevices currently managed by the first antenna line device, where T is an integer greater than or equal to 0. Correspondingly, after receiving the capability information change report sent by the first antenna line device, the primary device may manage the T subdevices currently managed by the first antenna line device, so that when an antenna line device cascaded with the first antenna line device is newly added, the primary device does not need to establish a communication link to the newly added antenna line device. Therefore, layer 1 and layer 2 protocols do not need to be modified to extend a new antenna line device or a new subdevice, and only a new subdevice needs to be extended at layer 7.

Implementation manners of this embodiment are described in detail below.

In a first feasible implementation manner, H subdevices are added to the subdevice managed by the first antenna line device in this implementation manner, where H is an integer greater than or equal to 1. Specifically, after the first antenna line device sends the first capability information report to the primary device, if an added subdevice is disposed in the first antenna line device, the first antenna line device may directly know the newly added subdevice and function information of the subdevice.

If an added subdevice is disposed in a newly added antenna line device, for example, a third antenna line device, the first antenna line device sends a third scanning command to the third antenna line device. The first antenna line device receives a third scanning response sent by the third antenna line device, where the third scanning response includes indication information used to indicate a type of the third antenna line device, sends a third HDLC address assignment command, where the third HDLC address assignment command includes a third HDLC address assigned by the first antenna line device to the third antenna line device, and establishes a communication link to the third antenna line device according to the third HDLC address. When the third antenna line device is not a container antenna line device, the first antenna line device may obtain function information of the newly added subdevice according to the type of the third antenna line device. When the third antenna line device is a container antenna line device, the first antenna line device sends a third capability information query command to the third antenna line device, and the third antenna line device sends a third capability information report to the first antenna line device, where the third capability information report includes function information of a subdevice managed by the third antenna line device, so that the first antenna line device can obtain function information of the added subdevice.

If an added subdevice is disposed in the foregoing second antenna line device, and the second antenna line device is a container antenna line device, the second antenna line device may proactively send, to the first antenna line device, a capability information change report including function information of a subdevice currently managed by the second antenna line device, so that the first antenna line device can obtain function information of the added subdevice.

The first antenna line device may determine, according to the foregoing descriptions, that a quantity of subdevices currently managed by the first antenna line device is T, where T is N+H, and then send a capability information change report to the primary device. For example, the first antenna line device sends, to the primary device, a capability information change report including function information of N subdevices and H subdevices. Optionally, the first antenna line device sends, to the primary device, a capability information change report including function information of newly added H subdevices. The capability information change report is further used to indicate that the H subdevices are added subdevices.

In a second feasible implementation manner, H subdevices are removed from subdevices managed by the first antenna line device in this implementation manner, where H is an integer greater than or equal to 1. Specifically, after the first antenna line device sends the first capability information report to the primary device, if a removed subdevice (that is, a deleted subdevice) is disposed in the first antenna line device, the first antenna line device may directly determine the removed subdevice.

If a removed subdevice (that is, a deleted subdevice) is disposed in the foregoing second antenna line device, and the second antenna line device is not a container antenna line device, that is, the second antenna line device is removed, the first antenna line device may obtain, according to a solution of the prior art, that the second antenna line device is removed, and therefore the removed subdevice is determined.

If an added subdevice is disposed in the foregoing second antenna line device, and the second antenna line device is a container antenna line device, the second antenna line device may proactively send, to the first antenna line device, a capability information change report including function information of a subdevice currently managed by the second antenna line device, so that the first antenna line device can determine the removed subdevice.

The first antenna line device may determine, according to the foregoing descriptions, that a quantity of subdevices currently managed by the first antenna line device is T, where T is N-H, and then send a capability information change report to the primary device. For example, the first antenna line device sends, to the primary device, a capability information change report including function information of N-H subdevices. Optionally, the first antenna line device sends, to the primary device, a capability information change report including function information of removed H subdevices. The capability information change report is further used to indicate that the H subdevices are removed subdevices.

In a third feasible implementation manner, H1 subdevices are added to and H2 subdevices are removed from the subdevice managed by the first antenna line device in this implementation manner. For a specific implementation process, refer to related descriptions in the forgoing first feasible implementation manner and second feasible implementation manner. Details are not described herein again.

It should be noted that in Embodiment 3 of the present application to Embodiment 7 of the present application, a working mode of a container antenna line device is a primary/secondary mode. That is, the container antenna line device functions as a secondary device for a primary device superior to the container antenna line device, and functions as a primary device for another secondary device subordinate to and cascaded with the container antenna line device. In this case, the container antenna line device does not transparently transmit, to a subordinate, all data sent by the primary device of the container antenna line device, but functions as a primary device to proactively find all secondary devices (all the secondary devices include a non-container antenna line device and/or a container antenna line device) cascaded with the container antenna line device, and present all the found secondary devices to the primary device as subdevices of the container antenna line device. A management operation of the primary device on a subdevice of the container antenna line device is parsed by the container antenna line device and then delivered by the container antenna line device to the subdevice of the container antenna line device or an antenna line device cascaded with the container antenna line device.

Figure 14:
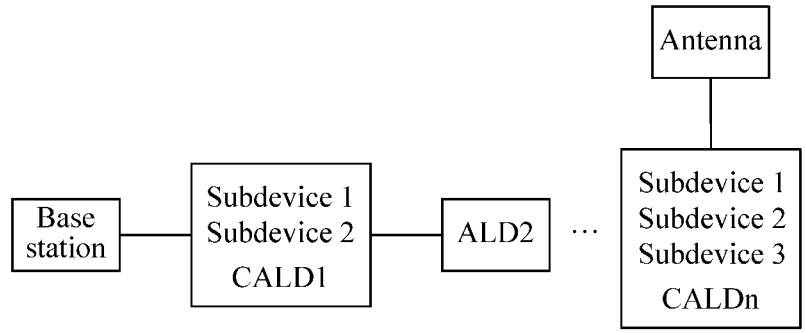
FIG. 14 is a third schematic diagram of physical connections between an antenna line device and a base station and between an antenna line device and an antenna according to an embodiment of the present application.
Figure 15:
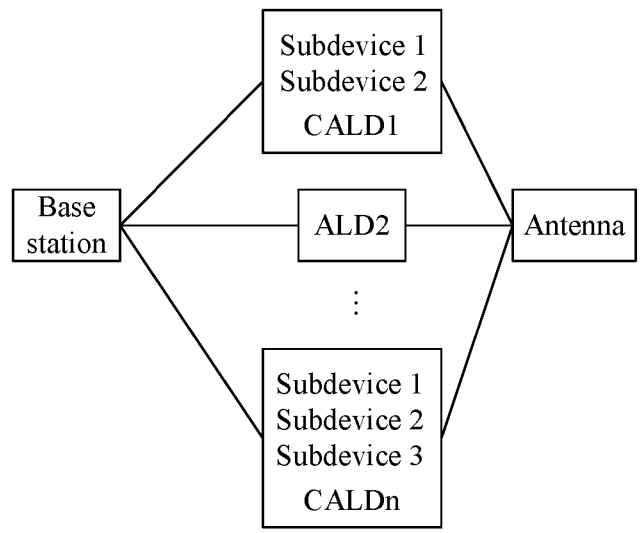
FIG. 15 is a third schematic diagram of logical connections between an antenna line device and a base station and between an antenna line device and an antenna according to an embodiment of the present application.

Optionally, based on Method Embodiment 1 or 2 of the present application, a working mode of the container antenna line device may be a transparent transmission mode. When working in this mode, the container antenna line device directly and transparently transmits, to an antenna line device (including a non-container antenna line device and/or a container antenna line device) cascaded with the container antenna line device, all data delivered by the primary device, and directly and transparently transmits, to the primary device of the container antenna line device, all data reported to the container antenna line device by an antenna line device cascaded with the container antenna line device. The container antenna line device processes only data sent by the primary device to the container antenna line device and broadcast data. It should be noted that in Embodiment 1 of the present application, the N subdevices managed by the antenna line device are subdevices disposed in the antenna line device, and in Embodiment 2 of the present application, the N subdevices managed by the first antenna line device are subdevices disposed in the first antenna line device. This embodiment of the present application is described in detail below by using examples. In a first feasible implementation manner, as shown in FIG. 14, the primary device is a base station, and a container antenna line device connected to the base station is a CALD1 shown in FIG. 14. Two subdevices are disposed in the CALD1. Antenna line devices cascaded with the CALD1 are an ALD2, . . . , and a CALDn. When the CALD1 works in a transparent transmission mode, the base station may obtain the CALD1, the ALD2, . . . , and the ALDn through scanning, and separately establish communication connections to the CALD1, the ALD2, . . . , and the ALDn, as shown in FIG. 15.

Figure 16:
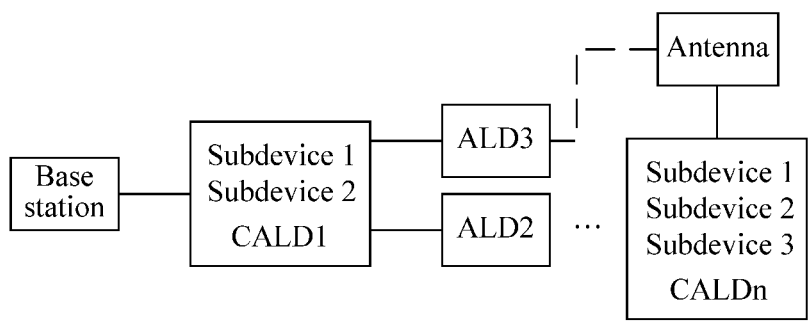
FIG. 16 is a fourth schematic diagram of physical connections between an antenna line device and a base station and between an antenna line device and an antenna according to an embodiment of the present application.
Figure 17:
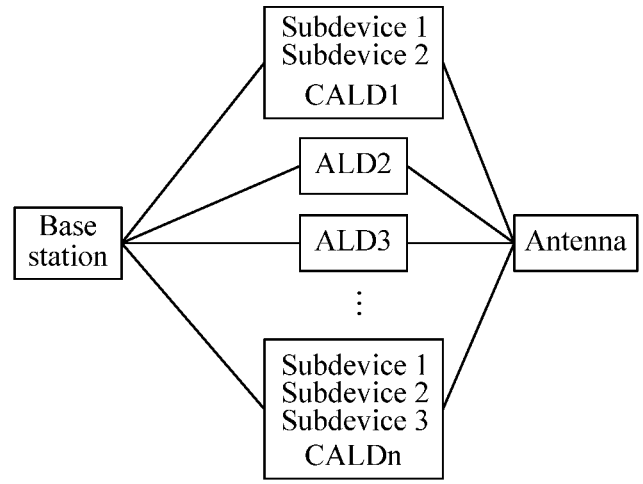
FIG. 17 is a fourth schematic diagram of logical connections between an antenna line device and a base station and between an antenna line device and an antenna according to an embodiment of the present application.

In a first feasible implementation manner, as shown in FIG. 16, a primary device is a base station, a container antenna line device connected to the base station is a CALD1 shown in FIG. 16, and antenna line devices cascaded with the CALD1 are an ALD2, an ALD3, . . . and a CALDn. A port connecting the CALD1 and the ALD2 is different from a port connecting the CALD1 and the ALD3. When the CALD1 works in a transparent transmission mode, the base station may obtain the CALD1, the ALD2, the ALD3, . . . , and the ALDn through scanning, and separately establish communication connections to the CALD1, the ALD2, the ALD3, . . . , and the ALDn, as shown in FIG. 17.

Figure 18:
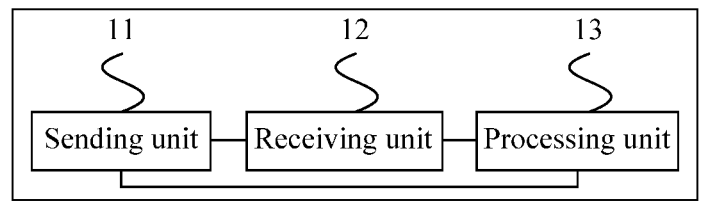
FIG. 18 is a schematic structural diagram of Embodiment 1 of a primary device according to the present application.

FIG. 18 is a schematic structural diagram of Embodiment 1 of a primary device according to the present application. As shown in FIG. 18, the primary device in this embodiment may include: a sending unit 11, a receiving unit 12, and a processing unit 13. The sending unit 11 is configured to send a scanning command to an antenna line device, where the scanning command is used to scan the antenna line device. The receiving unit 12 is configured to receive a scanning response sent by the antenna line device, where the scanning response includes indication information used to indicate a type of the antenna line device, the type of the antenna line device is a container antenna line device, the container antenna line device has a capability of managing multiple subdevices, and connection lines between all ports of the container antenna line device and a processor of the first antenna line device are different from each other. The sending unit 11 is further configured to send an HDLC address assignment command to the antenna line device, where the HDLC address assignment command includes an HDLC address assigned by the primary device to the antenna line device. The processing unit 13 is configured to establish a communication link to the antenna line device according to the HDLC address. The sending unit 11 is further configured to send a capability information query command to the antenna line device. The receiving unit 12 is further configured to receive a capability information report sent by the antenna line device, where the capability information report includes function information of each of N subdevices managed by the antenna line device, where N is an integer greater than or equal to 0. The processing unit 13 is further configured to manage the N subdevices according to the capability information report.

Optionally, the capability information report further includes an identifier, in the antenna line device, of each of the N subdevices managed by the antenna line device. When managing the N subdevices according to the capability information report, the processing unit 13 is specifically configured to send, according to a function of a to-be-managed subdevice, a management command used to manage the to-be-managed subdevice to the antenna line device. The management command includes an identifier, in the antenna line device, of the to-be-managed subdevice. The to-be-managed subdevice is any one of the N subdevices managed by the antenna line device.

Optionally, the scanning response further includes a communications protocol set supported by the antenna line device. The communications protocol set includes a release number of each communications protocol supported by the antenna line device. The processing unit 13 is further configured to: before the sending unit 11 sends the HDLC address assignment command to the antenna line device, when there is a communications protocol supported by the primary device in the communications protocol set supported by the antenna line device, select a release number of a communications protocol supported by the primary device from the communications protocol set supported by the antenna line device. When sending an HDLC address assignment command to the antenna line device, the sending unit 11 is specifically configured to send, to the antenna line device, an HDLC address assignment command including the HDLC address and the release number of the communications protocol that is selected by the primary device. When establishing a communication link to the antenna line device according to the HDLC address, the processing unit 13 is specifically configured to establish the communication link to the antenna line device according to the HDLC address and the communications protocol selected by the primary device.

Optionally, the sending unit 11 is further configured to: when there is no communications protocol supported by the primary device in the communications protocol set supported by the antenna line device, send a failure report to a network administrator. The failure report is used to indicate that the primary device does not support management of the antenna line device.

Optionally, the receiving unit 12 is further configured to: after the communication link is established to the antenna line device according to the HDLC address, receive topological relationship information sent by the antenna line device. The topological relationship information is used to indicate antenna line devices sequentially connected to each of all ports of the antenna line device.

The processing unit 13 is further configured to create, according to the topological relationship information, a tree topological relationship diagram that uses the primary device as a root node.

Optionally, the tree topological relationship diagram includes a star topological relationship diagram and/or a chain topological relationship diagram.

Optionally, the sending unit 11 is further configured to: after the processing unit 13 establishes the communication link to the antenna line device according to the HDLC address, send a permission configuration command to the antenna line device. The permission configuration command is used to configure a permission of the primary device of the antenna line device to manage the N subdevices by using a port of the antenna line device.

Optionally, the receiving unit 12 is further configured to receive a capability information change report sent by the antenna line device. The capability information change report includes function information of each of T subdevices currently managed by the antenna line device, and T is an integer greater than or equal to 0.

Optionally, the primary device is a base station, a PCU, or a container antenna line device.

The apparatus in this embodiment may be used to execute the technical solutions of the foregoing method embodiments of the present application that are executed by the primary device. The implementation principles and technical effects are similar, and are not further described herein.

Figure 19:
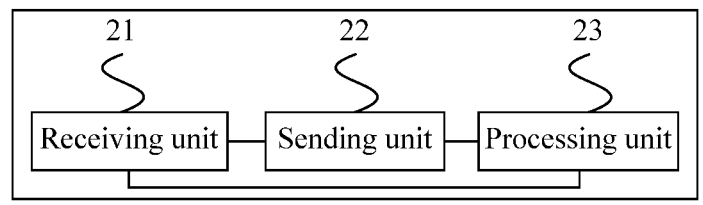
FIG. 19 is a schematic structural diagram of Embodiment 1 of an antenna line device according to the present application.

FIG. 19 is a schematic structural diagram of Embodiment 1 of an antenna line device according to the present application. As shown in FIG. 19, the antenna line device in this embodiment, when being used as a first antenna line device, may include: a receiving unit 21, a sending unit 22, and a processing unit 23. The receiving unit 21 is configured to receive a first scanning command sent by a primary device of the first antenna line device, where the first scanning command is used to scan the first antenna line device. The sending unit 22 is configured to send a first scanning response to the primary device according to the first scanning command, where the first scanning response includes indication information used to indicate a type of the first antenna line device, the type of the first antenna line device is a container antenna line device, the container antenna line device has a capability of managing multiple subdevices, and connection lines between all ports of the container antenna line device and a processor of the first antenna line device are different from each other. The receiving unit 21 is further configured to receive a first HDLC address assignment command sent by the primary device, where the first HDLC address assignment command includes a first HDLC address assigned by the primary device to the first antenna line device. The processing unit 23 is configured to establish a communication link to the primary device according to the first HDLC address. The receiving unit 21 is further configured to receive a first capability information query command sent by the primary device. The sending unit 22 is further configured to send a first capability information report to the primary device according to the first capability information query command, where the first capability information report includes function information of each of N subdevices managed by the first antenna line device, where N is an integer greater than or equal to 0.

Optionally, the first scanning response further includes a first communications protocol set supported by the first antenna line device. The first communications protocol set includes a release number of each communications protocol supported by the first antenna line device. When there is a communications protocol supported by the primary device in the first communications protocol set supported by the first antenna line device, when receiving the first HDLC address assignment command sent by the primary device, the receiving unit 21 is specifically configured to receive a first HDLC address assignment command that is sent by the primary device and that includes the first HDLC address and a first release number of a communications protocol that is selected by the primary device from the first communications protocol set. When establishing a communication link to the primary device according to the first HDLC address, the processing unit 23 is specifically configured to establish the communication link to the primary device according to the first HDLC address and the communications protocol that corresponds to the first release number.

Optionally, the sending unit 22 is further configured to send a second scanning command to a second antenna line device. The second antenna line device is any antenna line device cascaded with the first antenna line device. The second scanning command is used to scan the second antenna line device.

The receiving unit 21 is further configured to receive a second scanning response sent by the second antenna line device. The second scanning response includes indication information used to indicate a type of the second antenna line device.

The sending unit 22 is further configured to send a second HDLC address assignment command to the second antenna line device. The second HDLC address assignment command includes a second HDLC address assigned by the first antenna line device to the second antenna line device.

The processing unit 23 is further configured to: establish a communication link to the second antenna line device according to the second HDLC address, obtain, according to the indication information in the second scanning response, function information of a subdevice managed by the second antenna line device, and use the subdevice managed by the second antenna line device as a subdevice managed by the first antenna line device.

Optionally, when the indication information in the second scanning response is used to indicate that the type of the second antenna line device is a container antenna line device, when obtaining, according to the indication information in the second scanning response, the function information of the subdevice managed by the second antenna line device, the processing unit 23 is specifically configured to: send a second capability information query command to the second antenna line device; and receive a second capability information report sent by the second antenna line device. The second capability information report includes function information of K subdevices managed by the second antenna line device, and K is an integer greater than or equal to 0.

Optionally, the second scanning response further includes a second communications protocol set supported by the second antenna line device. The second communications protocol set includes a release number of each communications protocol supported by the second antenna line device.

The processing unit 23 is further configured to: before the sending unit 22 sends the second HDLC address assignment command to the second antenna line device, when there is a communications protocol supported by the first antenna line device in the second communications protocol set supported by the second antenna line device, select a communications protocol supported by the first antenna line device from the second communications protocol set supported by the second antenna line device.

When sending a second HDLC address assignment command to the second antenna line device, the sending unit 22 is specifically configured to send, to the second antenna line device, a second HDLC address assignment command including the second HDLC address and a second release number of the communications protocol selected by the first antenna line device.

When establishing a communication link to the second antenna line device according to the second HDLC address, the processing unit 23 is specifically configured to establish the communication link to the second antenna line device according to the second HDLC address and the communications protocol that corresponds to the second release number.

Optionally, the first release number is the same as or different from the second release number.

Optionally, the first capability information report further includes an identifier, in the first antenna line device, of each of the N subdevices managed by the first antenna line device. The receiving unit 21 is further configured to receive a management command that is sent by the primary device and that is used to manage a first subdevice. The management command includes an identifier, in the first antenna line device, of the first subdevice. The first subdevice is any subdevice managed by the first antenna line device.

The sending unit 22 is further configured to send the management command to the first subdevice according to the identifier, in the first antenna line device, of the first subdevice.

Optionally, if the first subdevice is disposed in the second antenna line device, when sending the management command to the first subdevice according to the identifier, in the first antenna line device, of the first subdevice, the sending unit 22 is specifically configured to: perform format conversion on the management command according to the type of the second antenna line device and a communications protocol for communication between the first antenna line device and the second antenna line device, and send the management command after the format conversion to the second antenna line device.

Optionally, the sending unit 22 is further configured to: after the processing unit 23 establishes the communication link to the primary device according to the first HDLC address, send first topological relationship information to the primary device. The first topological relationship information is used to indicate antenna line devices sequentially connected to each of all ports of the first antenna line device.

Optionally, the receiving unit 21 is further configured to: after the processing unit 23 establishes the communication link to the second antenna line device according to the second HDLC address, receive second topological relationship information sent by the second antenna line device. The second topological relationship information is used to indicate antenna line devices sequentially connected to each of all ports of the second antenna line device.

The processing unit 23 is further configured to obtain, as antenna line devices sequentially connected to a first port of the first antenna line device, the second antenna line device that is first connected to the first port of the first antenna line device and the antenna line devices that are sequentially connected to each of all the ports of the second antenna line device. The first port is any port of the first antenna line device. An antenna line device that is first connected to the first port is the second antenna line device.

Optionally, the receiving unit 21 is further configured to: after the processing unit 23 establishes the communication link to the primary device according to the first HDLC address, receive a permission configuration command sent by the primary device. The permission configuration command is used to configure a permission of the primary device of the antenna line device to manage the N subdevices by using a port of the first antenna line device.

The processing unit 23 is further configured to configure, according to the permission configuration command, the permission of the primary device of the antenna line device to manage the N subdevices by using a port of the first antenna line device.

Optionally, when a subdevice managed by the first antenna line device changes, the sending unit 22 is further configured to send a capability information change report to the primary device. The capability information change report includes function information of each of T subdevices currently managed by the first antenna line device, and T is an integer greater than or equal to 0.

Optionally, the primary device is a base station, a container antenna line device, or a PCU.

The apparatus in this embodiment may be used to execute the technical solutions of the foregoing method embodiments of the present application that are executed by the first antenna line device. The implementation principles and technical effects are similar, and are not further described herein.

Figure 20:
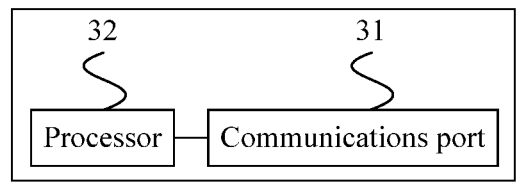
FIG. 20 is a schematic structural diagram of Embodiment 2 of a primary device according to the present application.

FIG. 20 is a schematic structural diagram of Embodiment 2 of a primary device according to the present application. As shown in FIG. 20, the primary device in this embodiment may include: a communications port 31 and a processor 32. The processor 32 is configured to: send a scanning command to an antenna line device by using the communications port 31, where the scanning command is used to scan the antenna line device; receive, by using the communications port 31, a scanning response sent by the antenna line device, where the scanning response includes indication information used to indicate a type of the antenna line device, the type of the antenna line device is a container antenna line device, the container antenna line device has a capability of managing multiple subdevices, and connection lines between all ports of the container antenna line device and a processor of the first antenna line device are different from each other; send an HDLC address assignment command to the antenna line device by using the communications port 31, where the HDLC address assignment command includes an HDLC address assigned by the primary device to the antenna line device; establish a communication link to the antenna line device according to the HDLC address; send a capability information query command to the antenna line device by using the communications port 31; receive, by using the communications port 31, a capability information report sent by the antenna line device, where the capability information report includes function information of each of N subdevices managed by the antenna line device, and N is an integer greater than or equal to 0; and manage the N subdevices according to the capability information report.

Optionally, the capability information report further includes an identifier, in the antenna line device, of each of the N subdevices managed by the antenna line device. When managing the N subdevices according to the capability information report, the processor 32 is specifically configured to send, according to a function of a to-be-managed subdevice, a management command used to manage the to-be-managed subdevice to the antenna line device. The management command includes an identifier, in the antenna line device, of the to-be-managed subdevice. The to-be-managed subdevice is any one of the N subdevices managed by the antenna line device.

Optionally, the scanning response further includes a communications protocol set supported by the antenna line device. The communications protocol set includes a release number of each communications protocol supported by the antenna line device. The processor 32 is further configured to: before sending the HDLC address assignment command to the antenna line device by using the communications port 31, when there is a communications protocol supported by the primary device in the communications protocol set supported by the antenna line device, select a release number of a communications protocol supported by the primary device from the communications protocol set supported by the antenna line device. When sending an HDLC address assignment command to the antenna line device by using the communications port 31, the processor 32 is specifically configured to send, to the antenna line device by using the communications port 31, an HDLC address assignment command including the HDLC address and the release number of the communications protocol that is selected by the primary device. When establishing a communication link to the antenna line device according to the HDLC address, the processor 32 is specifically configured to establish the communication link to the antenna line device according to the HDLC address and the communications protocol selected by the primary device.

Optionally, the processor 32 is further configured to: when there is no communications protocol supported by the primary device in the communications protocol set supported by the antenna line device, send a failure report to a network administrator by using the communications port 31. The failure report is used to indicate that the primary device does not support management of the antenna line device.

Optionally, the processor 32 is further configured to: after the communication link is established to the antenna line device according to the HDLC address, receive, by using the communications port 31, topological relationship information sent by the antenna line device. The topological relationship information is used to indicate antenna line devices sequentially connected to each of all ports of the antenna line device.

The processor 32 is further configured to create, according to the topological relationship information, a tree topological relationship diagram that uses the primary device as a root node.

Optionally, the tree topological relationship diagram includes a star topological relationship diagram and/or a chain topological relationship diagram.

Optionally, the processor 32 is further configured to: after establishing the communication link to the antenna line device according to the HDLC address, send a permission configuration command to the antenna line device by using the communications port 31. The permission configuration command is used to configure a permission of the primary device of the antenna line device to manage the N subdevices by using a port of the antenna line device.

Optionally, the processor 32 is further configured to receive, by using the communications port 31, a capability information change report sent by the antenna line device. The capability information change report includes function information of each of T subdevices currently managed by the antenna line device, and T is an integer greater than or equal to 0.

Optionally, the primary device is a base station, a PCU, or a container antenna line device.

Optionally, the primary device in this embodiment may further include a memory (not shown in the figure), configured to store program code for performing an antenna line device management method. The processor 32 is configured to invoke the program code in the memory to perform the foregoing operations.

The apparatus in this embodiment may be used to execute the technical solutions of the foregoing method embodiments of the present application that are executed by the primary device. The implementation principles and technical effects are similar, and are not further described herein.

Figure 21:
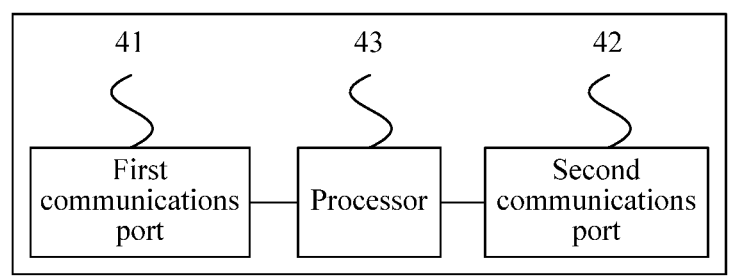
FIG. 21 is a schematic structural diagram of Embodiment 2 of an antenna line device according to the present application.

FIG. 21 is a schematic structural diagram of Embodiment 2 of an antenna line device according to the present application. As shown in FIG. 21, the antenna line device in this embodiment, when being used as a first antenna line device, may include: a first communications port 41, a second communications port 42, and a processor 43. A type of the antenna line device in this embodiment is a container antenna line device. The container antenna line device has a capability of managing multiple subdevices. A connection line between the first communications port 41 and the processor 43 and a connection line between the second communications port 42 and the processor 43 are different from each other, that is, are independent from each other. The processor 43 is configured to: receive, by using the first communications port 41, a first scanning command sent by a primary device of the first antenna line device, where the first scanning command is used to scan the first antenna line device; send a first scanning response to the primary device according to the first scanning command by using the first communications port 41, where the first scanning response includes indication information used to indicate the type of the first antenna line device; receive, by using the first communications port 41, a first HDLC address assignment command sent by the primary device, where the first HDLC address assignment command includes a first HDLC address assigned by the primary device to the first antenna line device; establish a communication link to the primary device according to the first HDLC address; receive, by using the first communications port 41, a first capability information query command sent by the primary device; and send a first capability information report to the primary device according to the first capability information query command by using the first communications port 41, where the first capability information report includes function information of each of N subdevices managed by the first antenna line device, where N is an integer greater than or equal to 0.

Optionally, the first scanning response further includes a first communications protocol set supported by the first antenna line device. The first communications protocol set includes a release number of each communications protocol supported by the first antenna line device. When there is a communications protocol supported by the primary device in the first communications protocol set supported by the first antenna line device, when receiving, by using the first communications port 41, the first HDLC address assignment command sent by the primary device, the processor 43 is specifically configured to receive, by using the first communications port 41, a first HDLC address assignment command that is sent by the primary device and that includes the first HDLC address and a first release number of a communications protocol that is selected by the primary device from the first communications protocol set. When establishing a communication link to the primary device according to the first HDLC address, the processor 43 is specifically configured to establish the communication link to the primary device according to the first HDLC address and the communications protocol that corresponds to the first release number.

Optionally, the processor 43 is further configured to: send, by using the second communications port 42, a second scanning command to a second antenna line device, where the second antenna line device is any antenna line device cascaded with the first antenna line device, and the second scanning command is used to scan the second antenna line device; receive, by using the second communications port 42, a second scanning response sent by the second antenna line device, where the second scanning response includes indication information used to indicate a type of the second antenna line device; send a second HDLC address assignment command to the second antenna line device by using the second communications port 42, where the second HDLC address assignment command includes a second HDLC address assigned by the first antenna line device to the second antenna line device; establish a communication link to the second antenna line device according to the second HDLC address; and obtain, according to the indication information in the second scanning response, function information of a subdevice managed by the second antenna line device, and use the subdevice managed by the second antenna line device as a subdevice managed by the first antenna line device.

Optionally, when the indication information in the second scanning response is used to indicate that the type of the second antenna line device is a container antenna line device, when obtaining, according to the indication information in the second scanning response, the function information of the subdevice managed by the second antenna line device, the processor 43 is specifically configured to: send a second capability information query command to the second antenna line device by using the second communications port 42; and receive, by using the second communications port 42, a second capability information report sent by the second antenna line device. The second capability information report includes function information of K subdevices managed by the second antenna line device, and K is an integer greater than or equal to 0.

Optionally, the second scanning response further includes a second communications protocol set supported by the second antenna line device. The second communications protocol set includes a release number of each communications protocol supported by the second antenna line device.

The processor 43 is further configured to: before sending the second HDLC address assignment command to the second antenna line device by using the second communications port 42, when there is a communications protocol supported by the first antenna line device in the second communications protocol set supported by the second antenna line device, select a communications protocol supported by the first antenna line device from the second communications protocol set supported by the second antenna line device.

When sending a second HDLC address assignment command to the second antenna line device by using the second communications port 42, the processor 43 is specifically configured to send, to the second antenna line device by using the second communications port 42, a second HDLC address assignment command including the second HDLC address and a second release number of the communications protocol selected by the first antenna line device.

When establishing a communication link to the second antenna line device according to the second HDLC address, the processor 43 is specifically configured to establish the communication link to the second antenna line device according to the second HDLC address and the communications protocol that corresponds to the second release number.

Optionally, the first release number is the same as or different from the second release number.

Optionally, the first capability information report further includes an identifier, in the first antenna line device, of each of the N subdevices managed by the first antenna line device. The processor 43 is further configured to: receive, by using the first communications port 41, a management command that is sent by the primary device and that is used to manage a first subdevice, where the management command includes an identifier, in the first antenna line device, of the first subdevice, and the first subdevice is any subdevice managed by the first antenna line device; and send the management command to the first subdevice according to the identifier, in the first antenna line device, of the first subdevice.

Optionally, if the first subdevice is disposed in the second antenna line device, when sending the management command to the first subdevice according to the identifier, in the first antenna line device, of the first subdevice, the processor 43 is specifically configured to: perform format conversion on the management command according to the type of the second antenna line device and a communications protocol for communication between the first antenna line device and the second antenna line device, and send the management command after the format conversion to the second antenna line device by using the second communications port 42.

Optionally, the processor 43 is further configured to: after establishing the communication link to the primary device according to the first HDLC address, send first topological relationship information to the primary device by using the first communications port 41. The first topological relationship information is used to indicate antenna line devices sequentially connected to each of all ports of the first antenna line device.

Optionally, the processor 43 is further configured to: after establishing the communication link to the second antenna line device according to the second HDLC address, receive, by using the second communications port 42, second topological relationship information sent by the second antenna line device. The second topological relationship information is used to indicate antenna line devices sequentially connected to each of all ports of the second antenna line device.

The processor 43 is further configured to obtain, as antenna line devices sequentially connected to a first port of the first antenna line device, the second antenna line device that is first connected to the first port of the first antenna line device and the antenna line devices that are sequentially connected to each of all the ports of the second antenna line device. The first port is any port of the first antenna line device. An antenna line device that is first connected to the first port is the second antenna line device.

Optionally, the processor 43 is further configured to: after establishing the communication link to the primary device according to the first HDLC address, receive, by using the first communications port 41, a permission configuration command sent by the primary device. The permission configuration command is used to configure a permission of the primary device of the antenna line device to manage the N subdevices by using a port of the first antenna line device.

The processor 43 is further configured to configure, according to the permission configuration command, the permission of the primary device of the antenna line device to manage the N subdevices by using a port of the first antenna line device.

Optionally, when a subdevice managed by the first antenna line device changes, the processor 43 is further configured to send a capability information change report to the primary device by using the first communications port 41. The capability information change report includes function information of each of T subdevices currently managed by the first antenna line device, and T is an integer greater than or equal to 0.

Optionally, the primary device is a base station, a container antenna line device, or a PCU.

Optionally, the antenna line device in this embodiment may further include a memory (not shown in the figure), configured to store program code for performing an antenna line device management method. The processor 43 is configured to invoke the program code in the memory to perform the foregoing operations.

The apparatus in this embodiment may be used to execute the technical solutions of the foregoing method embodiments of the present application that are executed by the first antenna line device. The implementation principles and technical effects are similar, and are not further described herein.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a read-only memory (ROM for short), a random access memory (RAM for short), a magnetic disk, or an optical disc.

Finally, it should be noted that the foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present application.

What is claimed is:

1. A method, comprising:
    sending, by a primary device, a scanning command to an antenna line device, wherein the scanning command is used to scan the antenna line device;
    receiving, by the primary device, a scanning response sent by the antenna line device, wherein the scanning response comprises indication information used to indicate a type of the antenna line device, wherein the type of the antenna line device is a container antenna line device, the container antenna line device has a capability of managing a plurality of subdevices, and connection lines between all ports of the container antenna line device and a processor of a first antenna line device are different from each other;
    sending, by the primary device, a High-Level Data Link Control (HDLC) address assignment command to the antenna line device, wherein the HDLC address assignment command comprises an HDLC address assigned by the primary device to the antenna line device;
    establishing, by the primary device, a communication link to the antenna line device according to the HDLC address;
    sending, by the primary device, a capability information query command to the antenna line device;
    receiving, by the primary device, a capability information report sent by the antenna line device, wherein the capability information report comprises function information of each of N subdevices managed by the antenna line device, wherein N is an integer greater than or equal to 0; and
    managing, by the primary device, the N subdevices according to the capability information report.

2. The method according to claim 1, wherein the capability information report further comprises an identifier, in the antenna line device, of each of the N subdevices managed by the antenna line device; and
    wherein managing, by the primary device, the N subdevices according to the capability information report comprises:
        sending, by the primary device according to a function of a to-be-managed subdevice, a management command to manage the to-be-managed subdevice to the antenna line device, wherein the management command comprises an identifier, in the antenna line device, of the to-be-managed subdevice, and the to-be-managed subdevice is any one of the N subdevices managed by the antenna line device.

3. The method according to claim 1, wherein the scanning response further comprises a communications protocol set supported by the antenna line device, wherein the communications protocol set comprises a release number of each communications protocol supported by the antenna line device;
    wherein before sending, by the primary device, the HDLC address assignment command to the antenna line device, the method further comprises: when there is a communications protocol supported by the primary device in the communications protocol set supported by the antenna line device, selecting, by the primary device, a release number of a communications protocol supported by the primary device from the communications protocol set supported by the antenna line device;
    wherein sending, by the primary device, the HDLC address assignment command to the antenna line device comprises: sending, by the primary device to the antenna line device, an HDLC address assignment command comprising the HDLC address and the release number of the communications protocol that is selected by the primary device; and
    wherein establishing, by the primary device, the communication link to the antenna line device according to the HDLC address comprises:
        establishing, by the primary device, the communication link to the antenna line device according to the HDLC address and the communications protocol selected by the primary device.

4. The method according to claim 3, wherein when there is no communications protocol supported by the primary device in the communications protocol set supported by the antenna line device, the primary device sends a failure report to a network administrator, wherein the failure report indicates that the primary device does not support management of the antenna line device.

5. The method according to claim 1, wherein after establishing, by the primary device, the communication link to the antenna line device according to the HDLC address, the method further comprises:
    receiving, by the primary device, topological relationship information sent by the antenna line device, wherein the topological relationship information indicates antenna line devices sequentially connected to each of all ports of the antenna line device; and
    creating, by the primary device according to the topological relationship information, a tree topological relationship diagram that uses the primary device as a root node.

6. The method according to claim 5, wherein the tree topological relationship diagram comprises a star topological relationship diagram, a chain topological relationship diagram, or both.

7. The method according to claim 1, wherein after establishing, by the primary device, the communication link to the antenna line device according to the HDLC address, the method further comprises:
    sending, by the primary device, a permission configuration command to the antenna line device, wherein the permission configuration command is used to configure a permission of the primary device of the antenna line device to manage the N subdevices by using a port of the antenna line device.

8. The method according to claim 1, further comprising:
    receiving, by the primary device, a capability information change report sent by the antenna line device, wherein the capability information change report comprises function information of each of T subdevices currently managed by the antenna line device, wherein T is an integer greater than or equal to 0.

9. The method according to claim 1, wherein the primary device is a base station, a portable control unit (PCU), or a container antenna line device.

10. A primary device, comprising:
a processor; and
a transceiver, configured to:
send a scanning command to an antenna line device, wherein the scanning command is used to scan the antenna line device; and
receive a scanning response sent by the antenna line device, wherein the scanning response comprises indication information indicating a type of the antenna line device, wherein the type of the antenna line device is a container antenna line device, the container antenna line device has a capability of managing a plurality of subdevices, and connection lines between all ports of the container antenna line device and a processor of a first antenna line device are different from each other;
send a High-Level Data Link Control (HDLC) address assignment command to the antenna line device, wherein the HDLC address assignment command comprises an HDLC address assigned by the primary device to the antenna line device;
wherein the processor is configured to establish a communication link to the antenna line device according to the HDLC address;
wherein the transceiver is further configured to send a capability information query command to the antenna line device;
wherein the transceiver is further configured to receive a capability information report sent by the antenna line device, wherein the capability information report comprises function information of each of N subdevices managed by the antenna line device, wherein N is an integer greater than or equal to 0; and
wherein the processor is further configured to manage the N subdevices according to the capability information report.

11. The primary device according to claim 10, wherein the capability information report further comprises an identifier, in the antenna line device, of each of the N subdevices managed by the antenna line device; and
wherein the processor is further configured to, when managing the N subdevices according to the capability information report, send, according to a function of a to-be-managed subdevice, a management command used to manage the to-be-managed subdevice to the antenna line device, wherein the management command comprises an identifier, in the antenna line device, of the to-be-managed subdevice, and the to-be-managed subdevice is any one of the N subdevices managed by the antenna line device.

12. The primary device according to claim 10, wherein the scanning response further comprises a communications protocol set supported by the antenna line device, wherein the communications protocol set comprises a release number of each communications protocol supported by the antenna line device;
wherein the processor is configured to, before the transceiver sends the HDLC address assignment command to the antenna line device, when there is a communications protocol supported by the primary device in the communications protocol set supported by the antenna line device, select a release number of a communications protocol supported by the primary device from the communications protocol set supported by the antenna line device;
wherein, when sending an HDLC address assignment command to the antenna line device, the transceiver is configured to send, to the antenna line device, an HDLC address assignment command comprising the HDLC address and the release number of the communications protocol that is selected by the primary device; and
wherein, when establishing a communication link to the antenna line device according to the HDLC address, the processor is configured to establish the communication link to the antenna line device according to the HDLC address and the communications protocol selected by the primary device.

13. The primary device according to claim 12, wherein the transceiver is further configured to:
when there is no communications protocol supported by the primary device in the communications protocol set supported by the antenna line device, send a failure report to a network administrator, wherein the failure report indicates that the primary device does not support management of the antenna line device.

14. The primary device according to claim 10, wherein the transceiver is further configured to, after the communication link is established to the antenna line device according to the HDLC address, receive topological relationship information sent by the antenna line device, wherein the topological relationship information indicates antenna line devices sequentially connected to each of all ports of the antenna line device; and
wherein the processor is configured to create, according to the topological relationship information, a tree topological relationship diagram that uses the primary device as a root node.

15. The primary device according to claim 14, wherein the tree topological relationship diagram comprises a star topological relationship diagram, a chain topological relationship diagram, or both.

16. The primary device according to claim 10, wherein the transceiver is further configured to, after the processor establishes the communication link to the antenna line device according to the HDLC address, send a permission configuration command to the antenna line device, wherein the permission configuration command configures a permission of the primary device of the antenna line device to manage the N subdevices using a port of the antenna line device.

17. The primary device according to claim 10, wherein the transceiver is further configured to receive a capability information change report sent by the antenna line device, wherein the capability information change report comprises function information of each of T subdevices currently managed by the antenna line device, wherein T is an integer greater than or equal to 0.

18. The primary device according to claim 10, wherein the primary device is a base station, a portable control unit (PCU), or a container antenna line device.

* * * * *